(12) United States Patent
Tabata et al.

(10) Patent No.: US 11,702,063 B2
(45) Date of Patent: Jul. 18, 2023

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yasuhiro Hiasa, Miyoshi (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/925,280

(22) Filed: Jul. 9, 2020

(65) Prior Publication Data

US 2021/0086751 A1 Mar. 25, 2021

(30) Foreign Application Priority Data

Sep. 20, 2019 (JP) .............................. JP2019-172310

(51) Int. Cl.
*B60W 20/30* (2016.01)
*G01P 3/08* (2006.01)
*B60W 20/15* (2016.01)

(52) U.S. Cl.
CPC ............ *B60W 20/30* (2013.01); *B60W 20/15* (2016.01); *G01P 3/08* (2013.01)

(58) Field of Classification Search
CPC ................. B60W 20/30; B60W 20/15; B60W 2510/0633; B60W 2510/081; B60W 2540/12; B60W 2710/0666; B60W 2710/081; B60W 20/19; B60W 30/1884; B60W 30/1882; B60W 10/06; B60W 10/08; B60W 10/184; B60W 20/00; B60W 30/20; B60W 2510/0638; G01P 3/08;
(Continued)

(56) References Cited

U.S. PATENT DOCUMENTS

2012/0143419 A1* 6/2012 Yun .................... B60W 20/50
903/930
2015/0114322 A1* 4/2015 Kamijo .................. F02B 63/04
123/2

FOREIGN PATENT DOCUMENTS

JP 2004153946 A 5/2004
JP 2005325807 A 11/2005
(Continued)

*Primary Examiner* — Aniss Chad
*Assistant Examiner* — Chase L Cooley
(74) *Attorney, Agent, or Firm* — Hunton Andrews Kurth LLP

(57) ABSTRACT

Since a maximum rotation speed of a second rotary machine is set to a lower value when a supercharging pressure is high than when the supercharging pressure is low, an engine torque decreases with an rotation speed of the second rotary machine which is relatively low and the rotation speed is less likely to fall into a high-rotation state. When the supercharging pressure is relatively low and the rotation speed is less likely to reach an upper-limit rotation speed of the second rotary machine, the maximum rotation speed is set to a relatively high value. Accordingly, the engine torque does not decrease to the rotation speed which is relatively high and power performance can be easily secured. As a result, it is possible to prevent a decrease in power performance due to the decrease in the engine torque and to prevent the rotation speed from falling into a high-rotation state.

7 Claims, 10 Drawing Sheets

(58) Field of Classification Search
CPC ... Y02T 10/62; Y02T 10/72; B60Y 2400/435;
B60K 6/24; B60K 6/445
See application file for complete search history.

(56) References Cited

FOREIGN PATENT DOCUMENTS

| | | | |
|---|---|---|---|
| JP | 2007314127 A | * | 12/2007 |
| JP | 2008247205 A | | 10/2008 |
| JP | 2013133085 A | | 7/2013 |
| JP | 2013159314 A | | 8/2013 |

* cited by examiner

| TRAVEL MODE | | | | C1 | B1 | MG1 | MG2 |
|---|---|---|---|---|---|---|---|
| EV | FORWARD/ REVERSE | SINGLE-MOTOR DRIVE | DRIVE | | | G | M |
| | | | USE IN COMBINATION WITH ENGINE BRAKE | △ | △ | G | M |
| | | TWO-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

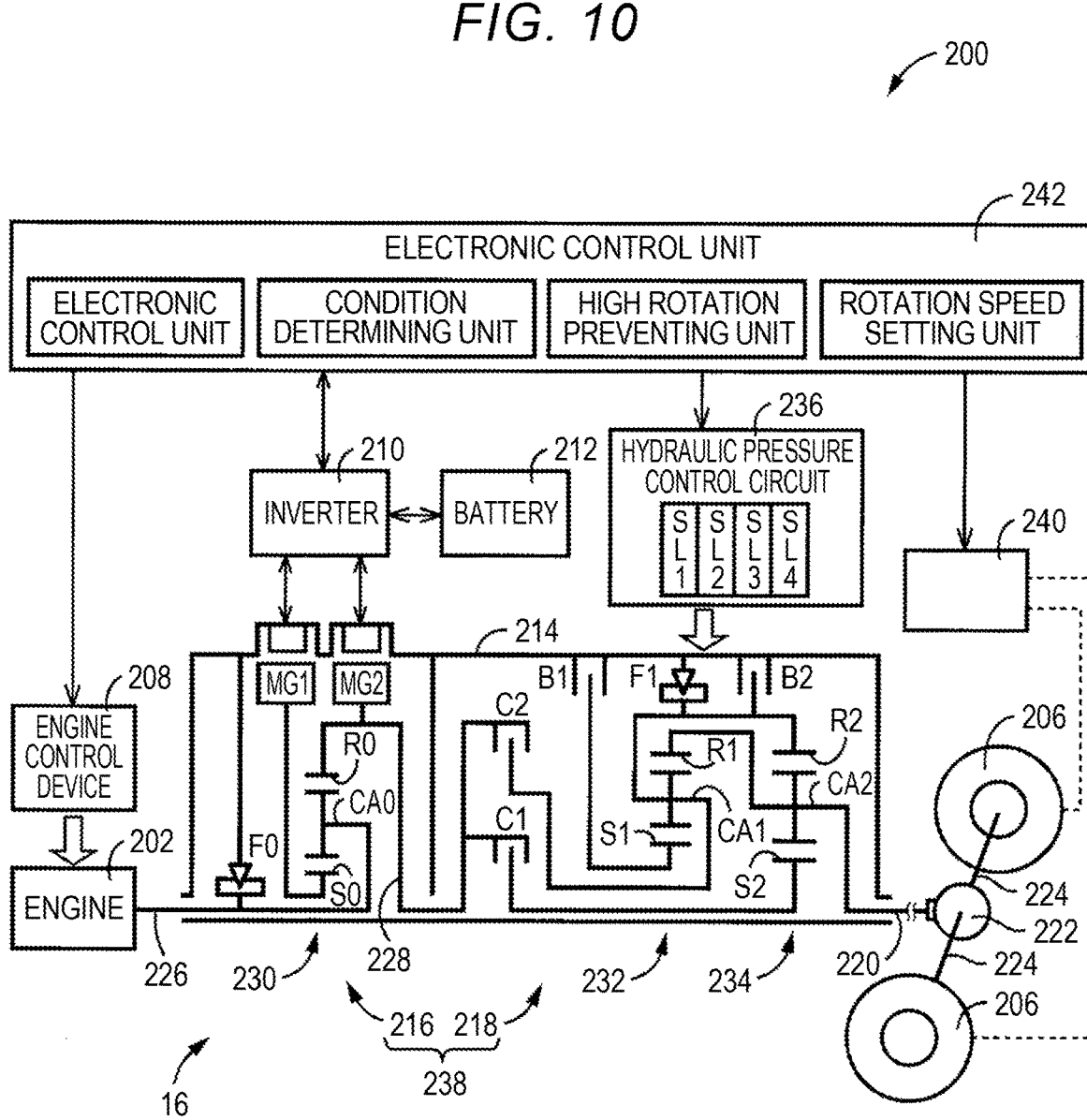

CONTROL DEVICE FOR HYBRID VEHICLE

CROSS-REFERENCE TO RELATED APPLICATION

This application claims priority to Japanese Patent Application No. 2019-172310 filed on Sep. 20, 2019, incorporated herein by reference in its entirety.

BACKGROUND

1. Technical Field

The present disclosure relates to a control device for a hybrid vehicle including an engine with a supercharger and a rotary machine.

2. Description of Related Art

A control device for a hybrid vehicle including an engine that serves as a power source for travel and a rotary machine that is connected to driving wheels in a power-transmittable manner is well known. An example thereof is a vehicle described in Japanese Patent Application Publication No. 2008-247205 (JP 2008-247205 A). JP 2008-247205 A discloses that the engine is controlled such that a rotation speed of the engine is within a range which is not higher than a maximum rotation speed with a margin from a predetermined upper-limit rotation speed of the engine.

SUMMARY

In such a hybrid vehicle, there is a likelihood of a high-rotation state in which a rotation speed of the rotary machine can reach a predetermined upper-limit rotation speed. On the other hand, in order to prevent the rotation speed of the rotary machine from falling into such a high-rotation state, decreasing the output torque of the engine when the rotation speed of the rotary machine is higher than a maximum rotation speed with a margin from a predetermined upper-limit rotation speed of the rotary machine can be considered. However, when the engine includes a supercharger, a response delay of the output torque of the engine occurs due to a response delay of a supercharging pressure. Accordingly, even when the engine is controlled such that the output torque of the engine is decreased, there is concern of falling into a high-rotation state in which the rotation speed of the rotary machine can reach the predetermined upper-limit rotation speed.

The present disclosure provides a control device for a hybrid vehicle that can prevent a decrease in power performance due to a decrease in an output torque of an engine and prevent a rotation speed of a rotary machine from falling into a high-rotation state.

According to a first aspect of the present disclosure, there is provided (a) a control device for a hybrid vehicle including an engine with a supercharger which serves as a travel power source and a rotary machine which is connected to driving wheels in a power-transmittable manner, the control device including: (b) a high rotation preventing unit configured to decrease an output torque of the engine such that a rotation speed of the rotary machine does not reach a predetermined upper-limit rotation speed when the rotation speed of the rotary machine is higher than a maximum rotation speed with a margin of the rotation speed of the rotary machine from the predetermined upper-limit rotation speed of the rotary machine; and (c) a rotation speed setting unit configured to set the maximum rotation speed to a lower value when a supercharging pressure from the supercharger is high than when the supercharging pressure is low.

A second aspect provides the control device for a hybrid vehicle according to the first aspect, wherein the rotation speed setting unit is configured to set the maximum rotation speed to a lower value as the supercharging pressure becomes higher.

A third aspect provides the control device for a hybrid vehicle according to the first or second aspect, further including a condition determining unit configured to determine whether a vehicle condition is a predetermined vehicle condition in which the rotation speed of the rotary machine is likely to reach the predetermined upper-limit rotation speed, wherein the rotation speed setting unit is configured to set the maximum rotation speed to a lower value when it is determined that the vehicle condition is the predetermined vehicle condition than when it is determined that the vehicle condition is not the predetermined vehicle condition.

A fourth aspect provides the control device for a hybrid vehicle according to the third aspect, wherein the rotation speed setting unit is configured to perform setting of the maximum rotation speed based on the supercharging pressure only when it is determined that the vehicle condition is the predetermined vehicle condition.

A fifth aspect provides the control device for a hybrid vehicle according to the third or fourth aspect, wherein the condition determining unit is configured to determine whether the vehicle condition is the predetermined vehicle condition based on whether a travel road of the hybrid vehicle is in a surface condition in which the driving wheels are likely to idle.

A sixth aspect provides the control device for a hybrid vehicle according to any one of the third to fifth aspects, wherein the condition determining unit is configured to determine whether the vehicle condition is the predetermined vehicle condition based on whether a braking operation of a brake device that applies a wheel brake torque to the driving wheels is limited.

A seventh aspect provides the control device for a hybrid vehicle according to any one of the third to sixth aspects, wherein the rotation speed setting unit is configured to set the maximum rotation speed to a lower value as the vehicle condition is a vehicle condition in which the rotation speed of the rotary machine is more likely to reach the predetermined upper-limit rotation speed.

According to the first aspect, when the supercharging pressure from the supercharger is high, the rotation speed of the rotary machine is more likely to reach the predetermined upper-limit rotation speed due to a response delay of the supercharging pressure and the maximum rotation speed is set to a lower value, in comparison with a case in which the supercharging pressure is low. Accordingly, the output torque of the engine decreases with a relatively low rotation speed of the rotary machine and the rotation speed of the rotary machine is less likely to fall into a high-rotation state. When the supercharging pressure is relatively low and the rotation speed of the rotary machine is less likely to reach the predetermined upper-limit rotation speed, the maximum rotation speed is set to a relatively high value. Accordingly, the output torque of the engine does not decrease to a relatively high rotation speed of the rotary machine and power performance is likely to be secured. As a result, it is possible to prevent a decrease in power performance due to a decrease in the output torque of the engine and to prevent the rotation speed of the rotary machine from falling into a high-rotation state.

According to the second aspect, since the maximum rotation speed is set to a lower value as the supercharging pressure becomes higher, the rotation speed of the rotary machine is less likely to appropriately fall into a high-rotation state when the supercharging pressure is relatively high, and it becomes easier to appropriately secure power performance when the supercharging pressure is relatively low.

According to the third aspect, when it is determined that the vehicle condition is a predetermined vehicle condition in which the rotation speed of the rotary machine is likely to reach the predetermined upper-limit rotation speed, the maximum rotation speed is set to a lower value in comparison with a case in which it is determined that the vehicle condition is not the predetermined vehicle condition. Accordingly, the output torque of the engine decreases with a relatively low rotation speed of the rotary machine and the rotation speed of the rotary machine is less likely to fall into a high-rotation state.

According to the fourth aspect, setting of the maximum rotation speed based on the supercharging pressure is performed only when it is determined that the vehicle condition is the predetermined vehicle condition. Accordingly, when the rotation speed of the rotary machine is likely to reach the predetermined upper-limit rotation speed, the rotation speed of the rotary machine is less likely to appropriately fall into a high-rotation state. When it is determined that the vehicle condition is not the predetermined vehicle condition, setting of the maximum rotation speed based on the supercharging pressure is not performed. Accordingly, when the rotation speed of the rotary machine is less likely to reach the predetermined upper-limit rotation speed, power performance can be easily secured. When setting of the maximum rotation speed based on the supercharging pressure is not performed, it means that the output torque of the engine decreases with the maximum rotation speed which is a constant value regardless of the supercharging pressure as a threshold value, and it is possible to expect an effect that a driver is less likely to feel discomfort.

According to the fifth aspect, when the travel road of the hybrid vehicle is in a surface condition in which the driving wheels are likely to idle, it is determined that the vehicle condition is the predetermined vehicle condition, and thus the rotation speed of the rotary machine is less likely to fall into a high-rotation state.

According to the sixth aspect, when the braking operation using the brake device that can apply a wheel brake torque to the driving wheels is limited, it is determined that the vehicle condition is the predetermined vehicle condition, and thus the rotation speed of the rotary machine is less likely to fall into a high-rotation state.

According to the seventh aspect, the rotation speed of the rotary machine is more likely to fall into a high-rotation state as the rotation speed of the rotary machine is more likely to reach the predetermined upper-limit rotation speed, and the maximum rotation speed is set to a lower value as the vehicle condition becomes a vehicle condition in which the rotation speed of the rotary machine is more likely to reach the predetermined upper-limit rotation speed. Accordingly, the rotation speed of the rotary machine is less likely to fall into a high-rotation state.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 10 is a diagram schematically illustrating a configuration of a vehicle to which the present disclosure is applied and which is different from the vehicle illustrated in FIG. 1;

FIG. 11 is an operation table illustrating a relationship between combinations of a gear shifting operation of a mechanical stepped gear shifting unit illustrated in FIG. 10 and an operation of an engagement device which is used therein;

DETAILED DESCRIPTION OF EMBODIMENTS

Hereinafter, embodiments of the present disclosure will be described in detail with reference to the accompanying drawings.

Figure 1:
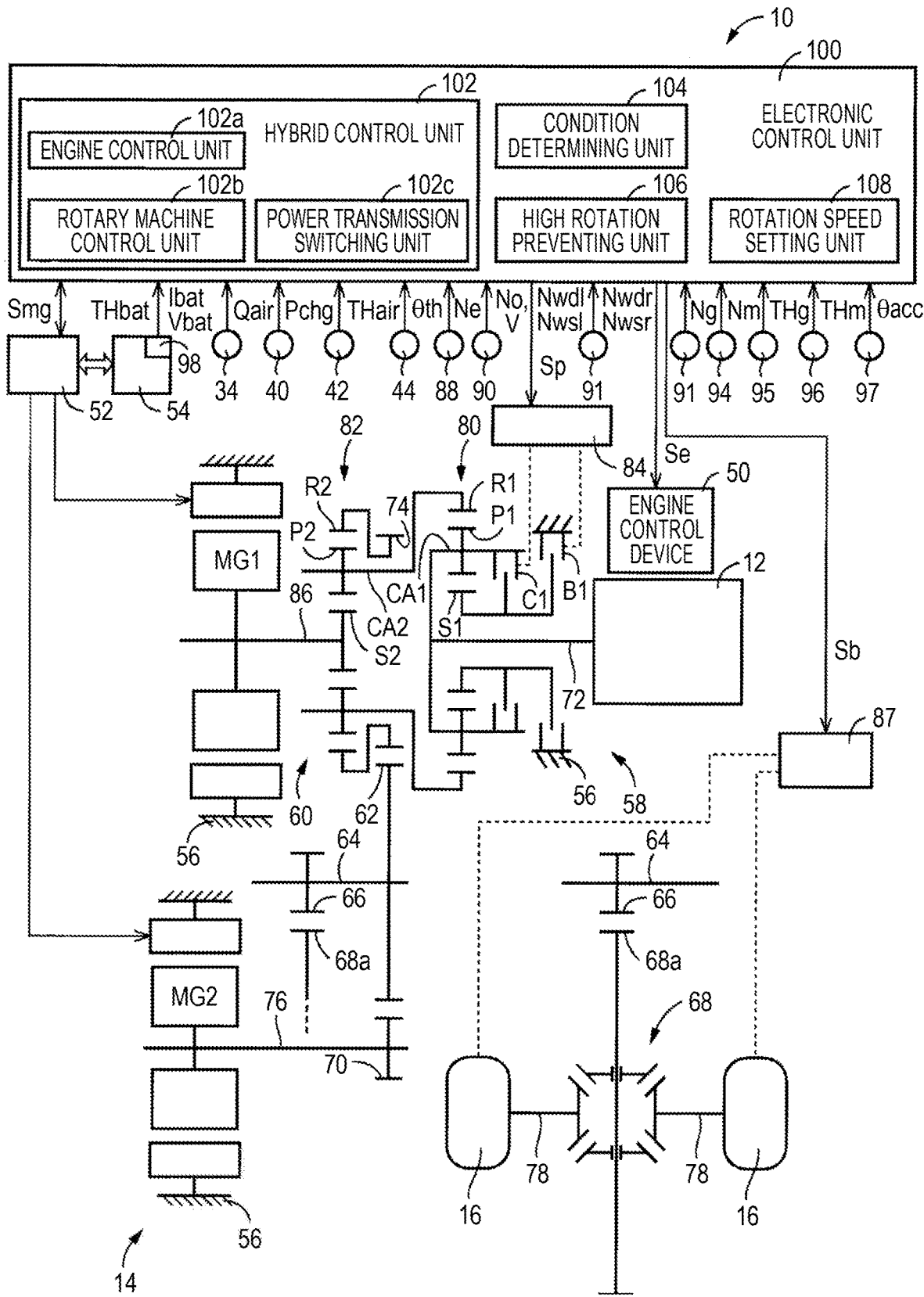
FIG. 1 is a diagram schematically illustrating a configuration of a vehicle to which the present disclosure is applied and illustrating principal parts of a control function and a control system for various types of control in the vehicle.

FIG. 1 is a diagram schematically illustrating a configuration of a vehicle 10 to which the present disclosure is applied and illustrating principal parts of a control function and a control system for various types of control in the vehicle 10. In FIG. 1, the vehicle 10 is a hybrid vehicle including an engine 12, a first rotary machine MG1, a second rotary machine MG2, a power transmission device 14, driving wheels 16.

Figure 2:
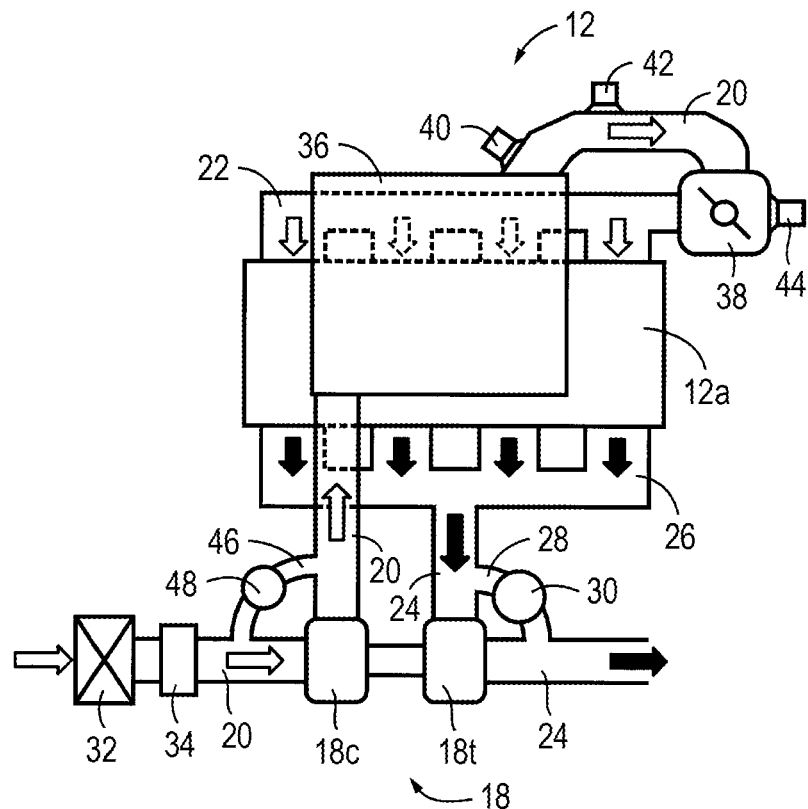
FIG. 2 is a diagram schematically illustrating a configuration of an engine.

FIG. 2 is a diagram schematically illustrating a configuration of the engine 12. In FIG. 2, the engine 12 is a travel power source of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust turbine type supercharger, that is, an exhaust-turbine supercharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to bypass the turbine 18t and to flow from upstream to downstream with respect to the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening of the waste gate valve 30 is continuously adjusted by causing an electronic control unit 100 which will be described later to operate an actuator which is not illustrated. As the valve opening of the waste gate valve 30 increases, exhaust gas of the engine 12 is more likely to be discharged via the exhaust bypass 28. Accordingly, in a supercharged state of the engine 12 in which a supercharging operation of the supercharger 18 is effective, a supercharging pressure Pchg from the supercharger 18 decreases as the valve opening of the waste gate valve 30 increases. The supercharging pressure Pchg from the supercharger 18 is a pressure of intake air and is an atmospheric pressure downstream from the compressor 18c in the intake pipe 20. A side in which the supercharging pressure Pchg is low is, for example, a side with a pressure of intake air in a non-supercharged state of the engine 12 in which the supercharging operation of the supercharger 18 does not work at all, that is, a side with a pressure of intake air in an engine with no supercharger 18.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg from the supercharger 18 and an intake air temperature sensor 42 that detects an intake air temperature THair which is the temperature of intake air are provided in the intake pipe 20 between the intercooler 36 and the electronic throttle valve 38. A throttle valve opening sensor 44 that detects a throttle valve opening θth which is an opening of the electronic throttle valve 38 is provided in the vicinity of the electronic throttle valve 38, for example, in a throttle actuator.

An air recirculation bypass 46 that recirculates air from downstream to upstream with respect to the compressor 18c by bypassing the compressor 18c is provided in parallel in the intake pipe 20. For example, an air bypass valve (=ABV) 48 that is opened at the time of sudden closing of the electronic throttle valve 38 to curb occurrence of a surge and to protect the compressor 18c is provided in the air recirculation bypass 46.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, and the waste gate valve 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque at a positive torque which is an acceleration side and is a regenerative torque at a negative torque which is a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

A power transmission device 14 includes a gear shifting unit 58, a differential unit 60, a driven gear 62, a driven shaft 64, a final gear 66, a differential device 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential device 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel to an input shaft 72 is connected to the reduction gear 70 separately from the input shaft 72 and is connected to the second rotary machine MG2 in a power-transmittable manner. The power transmission device 14 includes an axle 78 that is connected to the differential device 68.

The power transmission device 14 having this configuration is suitably used for a vehicle of a front-engine front-drive (FF) type or rear-engine rear-drive (RR) type. In the power transmission device 14, power which is output from the engine 12, the first rotary machine MG1, and the second rotary machine MG2 is transmitted to the driven gear 62 and is transmitted from the driven gear 62 to the driving wheels 16 sequentially via the final gear 66, the differential device 68, and the axle 78. In this way, the second rotary machine MG2 is a rotary machine that is connected to the driving wheels 16 in a power-transmittable manner. In the power transmission device 14, the engine 12, the gear shifting unit 58, the differential unit 60, the first rotary machine MG1, and the second rotary machine MG2 are arranged on different axes, whereby a shaft length is decreased. A reduction gear ratio of the second rotary machine MG2 can be set to be great. Power is synonymous with torque or force when not particularly distinguished.

The gear shifting unit 58 includes a first planetary gear mechanism 80, a clutch C1, and a brake B1. The differential unit 60 includes a second planetary gear mechanism 82. The first planetary gear mechanism 80 is a known single-pinion type planetary gear unit including a first sun gear S1, a first pinion P1, a first carrier CA1 that supports the first pinion P1 such that it can rotate and revolve, and a first ring gear R1 that engages with the first sun gear S1 via the first pinion P1. The second planetary gear mechanism 82 is a known single-pinion type planetary gear unit including a second sun gear S2, a second pinion P2, a second carrier CA2 that supports the second pinion P2 such that it can rotate and revolve, and a second ring gear R2 that engages with the second sun gear S2 via the second pinion P2.

In the first planetary gear mechanism 80, the first carrier CA1 is a rotary element that is integrally connected to the input shaft 72 and connected to the engine 12 via the input shaft 72 in a power-transmittable manner. The first sun gear S1 is a rotary element that is selectively connected to the case 56 via a brake B1. The first ring gear R1 is a rotary element that is connected to the second carrier CA2 of the second planetary gear mechanism 82 which is an input rotary member of the differential unit 60 and serves as an output rotary member of the gear shifting unit 58. The first carrier CA1 and the first sun gear S1 are selectively connected to each other via a clutch C1.

The clutch C1 and the brake B1 are wet frictional engagement devices and multi-disc hydraulic frictional engagement devices of which engagement is controlled by a hydraulic actuator. The clutch C1 and the brake B1 are controlled by the electronic control unit 100 which will be described later, whereby operating states such as an engaged state and a disengaged state are switched based on regulated hydraulic pressures Pc1 and Pb1 which are output from a hydraulic pressure control circuit 84 provided in the vehicle 10 by causing the electronic control unit 100 which will be described later to control the hydraulic pressure control circuit 84.

In a state in which both the clutch C1 and the brake B1 are disengaged, a differential motion of the first planetary gear mechanism 80 is permitted. Accordingly, in this state, since a reaction torque of the engine torque Te is not taken in the first sun gear S1, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. Accordingly, in this state, rotation of the engine 12 is transmitted from the first ring gear R1 to the second carrier CA2 at a constant speed. On the other hand, in a state in which the clutch C1 is disengaged and the brake B1 is engaged, rotation of the first sun gear S1 of the first planetary gear mechanism 80 is prohibited and rotation of the first ring gear R1 is increased to be higher than rotation of the first carrier CA1. Accordingly, in this state, rotation of the engine 12 is increased and output from the first ring gear R1. In this way, the gear shifting unit 58 serves as a two-stage stepped transmission which is switched, for example, between a low gear stage in a directly coupled state with a gear ratio of "1.0" and a high gear state in an overdrive state with a gear ratio of "0.7." In a state in which both the clutch C1 and the brake B1 are engaged, rotation of the rotary elements of the first planetary gear mechanism 80 is prohibited. Accordingly, in this state, rotation of the first ring gear R1 which is the output rotary member of the gear shifting unit 58 is stopped and thus rotation of the second carrier CA2 which is the input rotary member of the differential unit 60 is stopped.

In the second planetary gear mechanism 82, the second carrier CA2 is a rotary element which is connected to the first ring gear R1 which is the output rotary member of the gear shifting unit 58 and serves as an input rotary member of the differential unit 60. The second sun gear S2 is a rotary element that is integrally connected to the rotor shaft 86 of the first rotary machine MG1 and is connected to the first rotary machine MG1 in a power-transmittable manner. The second ring gear R2 is a rotary element that is integrally connected to the drive gear 74 and is connected to the driving wheels 16 in a power-transmittable manner and serves as an output rotary member of the differential unit 60. The second planetary gear mechanism 82 is a power split mechanism that mechanically splits power of the engine 12 which is input to the second carrier CA2 via the gear shifting unit 58 to the first rotary machine MG1 and the drive gear 74. That is, the second planetary gear mechanism 82 is a differential mechanism that splits and transmits power of the engine 12 to the driving wheels 16 and the first rotary machine MG1. In the second planetary gear mechanism 82, the second carrier CA2 serves as an input element, the second sun gear S2 serves as a reaction element, and the second ring gear R2 serves as an output element. The differential unit 60 constitutes an electrical gear shifting mechanism, for example, an electrical stepless transmission, in which a differential state of the second planetary gear mechanism 82 is controlled by controlling the operating state of the first rotary machine MG1 along with the first rotary machine MG1 that is connected to the second planetary gear mechanism 82 in a power-transmittable manner. The first rotary machine MG1 is a rotary machine to which power of the engine 12 is transmitted. Since the gear shifting unit 58 is in overdrive, an increase in torque of the first rotary machine MG1 is curbed. Controlling the operating state of the first rotary machine MG1 refers to performing operation control of the first rotary machine MG1.

Figure 3:
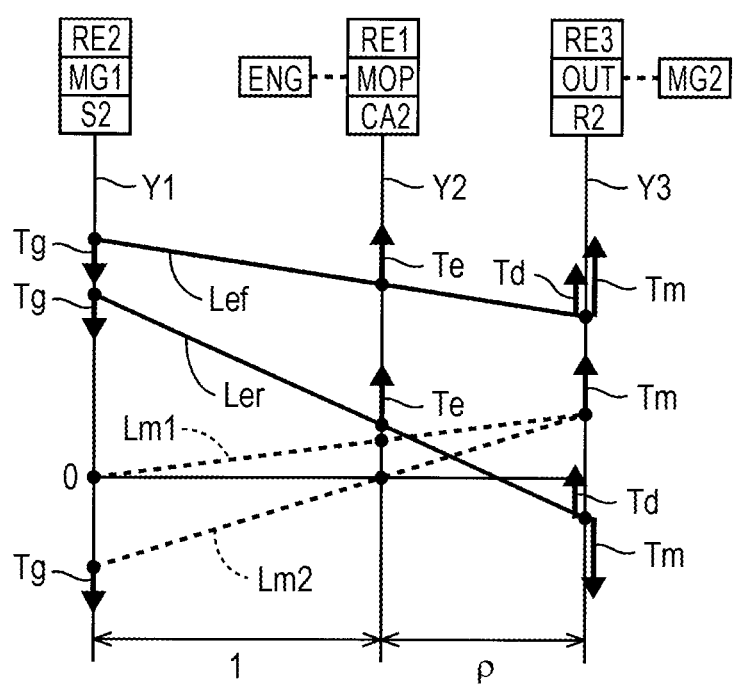
FIG. 3 is a diagram relatively illustrating rotation speeds of rotary elements in a differential unit.

FIG. 3 is a diagram illustrating rotation speeds of the rotary elements in the differential unit 60 relative to each other. In FIG. 3, three vertical lines Y1, Y2, and Y3 correspond to three rotary elements of the second planetary gear mechanism 82 constituting the differential unit 60. The vertical line Y1 represents the rotation speed of the second sun gear S2 which is a second rotary element RE2 connected to the first rotary machine MG1 (see "MG1" in the drawing). The vertical line Y2 represents the rotation speed of the second carrier CA2 which is a first rotary element RE1 connected to the engine 12 (see "ENG" in the drawing) via the gear shifting unit 58. The vertical line Y3 represents the rotation speed of the second ring gear R2 which is a third rotary element RE3 integrally connected to the drive gear 74 (see "OUT" in the drawing). The second rotary machine MG2 (see "MG2" in the drawing) is connected to the driven gear 62 engaging with the drive gear 74 via the reduction gear 70 or the like. A mechanical oil pump (see "MOP" in the drawing) which is provided in the vehicle 10 is connected to the second carrier CA2. This mechanical oil pump is operated with rotation of the second carrier CA2 to supply oil which is used for engaging operations of the clutch C1 and the brake B1, lubrication of the parts, and cooling of the parts. When rotation of the second carrier CA2 is stopped, the oil is supplied by an electrical oil pump (not illustrated) which is provided in the vehicle 10. The gaps between the vertical lines Y1, Y2, and Y3 are determined according to a gear ratio ρ (=number of teeth of the sun gear/number of teeth of the ring gear) of the second planetary gear mechanism 82. In the relationship between the vertical axes in the diagram, when the gap between a sun gear and a carrier corresponds to "1," the gap between the carrier and a ring gear corresponds to the gear ratio ρ.

A solid line Lef in FIG. 3 denotes an example of relative speeds of the rotary elements at the time of forward travel in a hybrid travel (=HV travel) mode in which hybrid travel using at least the engine 12 as a power source is possible. A solid line Ler in FIG. 3 denotes an example of relative speeds of the rotary elements at the time of reverse travel in the HV travel mode. In the HV travel mode, in the second planetary gear mechanism 82, for example, when an MG1 torque Tg which is a reaction torque and a negative torque of the first rotary machine MG1 with respect to an engine torque Te that is a positive torque which is input to the second carrier CA2 via the gear shifting unit 58 is input to the second sun gear S2, a direct engine-transmitted torque Td which is a positive torque appears in the second ring gear R2. For example, when the MG1 torque Tg (=−ρ/(1+ρ)×Te) which is a reaction torque with respect to the engine torque Te that is a positive torque which is input to the second carrier CA2 is input to the second sun gear S2 in a state in which the clutch C1 is engaged, the brake B1 is disengaged, and the gear shifting unit 58 is in a directly coupled state with a gear ratio of "1.0," a direct engine-transmitted torque Td (=Te/(1+ρ)=−(1/ρ)×Tg) appears in the second ring gear R2. A combined torque of the direct engine-transmitted torque Td and the MG2 torque Tm which are transmitted to the driven gear 62 can be transmitted as a drive torque of the vehicle 10 to the driving wheels 16 according to a required driving force. The first rotary machine MG1 serves as a power generator when a negative torque is generated at the time of positive rotation. A generated electric power Wg of the first rotary machine MG1 charges the battery 54 or is consumed in the second rotary machine MG2. The second rotary machine MG2 outputs the MG2 torque Tm using all or some of the generated electric power Wg or electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the second sun gear S2, increases or decreases with respect to an output rotation speed No which is the rotation speed of the drive gear 74 which is constrained on rotation of the driving wheels 16 by controlling the operating state of the first rotary machine MG1, the rotation speed of the second carrier CA2 increases or decreases. Since the second carrier CA2 is connected to the engine 12 via the gear shifting unit 58, an engine rotation speed Ne which is the rotation speed of the engine 12 increases or decreases with the increase or decrease in the rotation speed of the second carrier CA2. Accordingly, in the HV travel, it is possible to perform control such that an engine operating point OPeng is set to an efficient operating point. This hybrid type is referred to as a mechanical split type or a split type. The first rotary machine MG1 is a rotary machine that can control the engine rotation speed Ne, that is, a rotary machine that can adjust the engine rotation speed Ne. An operating point is an operation point which is expressed by a rotation speed and a torque, and the engine operating point OPeng is an operation point of the engine 12 which is expressed by the engine rotation speed Ne and the engine torque Te.

A dotted line Lm1 in FIG. 3 represents an example of relative speeds of the rotary elements at the time of forward travel in a single-motor-driven EV mode in which motor-driven travel using only the second rotary machine MG2 as a power source is possible in a motor-driven travel (=EV travel) mode. A dotted line Lm2 in FIG. 3 represents an example of relative speeds of the rotary elements at the time of forward travel in a two-motor-driven EV mode in which motor-driven travel using both the first rotary machine MG1 and the second rotary machine MG2 as a power source is possible in the EV travel mode. The EV travel mode is a travel mode in which motor-driven travel using at least one of the first rotary machine MG1 and the second rotary machine MG2 as a power source in a state in which operation of the engine 12 is stopped is possible.

In the single-motor-driven EV mode, when both the clutch C1 and the brake B1 are disengaged and the gear shifting unit 58 fall into a neutral state, the differential unit 60 also falls into a neutral state. In this state, the MG2 torque Tm can be transmitted as a drive torque of the vehicle 10 to the driving wheels 16. In the single-motor-driven EV mode, for example, the first rotary machine MG1 is maintained at zero rotation in order to reduce a drag loss in the first rotary machine MG1. For example, even when control for maintaining the first rotary machine MG1 at zero rotation is performed, the differential unit 60 is in the neutral state and thus the drive torque is not affected.

In the two-motor-driven EV mode, when both the clutch C1 and the brake B1 are engaged and rotation of the rotary elements of the first planetary gear mechanism 80 is prohibited, the second carrier CA2 is stopped at zero rotation. In this state, the MG1 torque Tg and the MG2 torque Tm can be transmitted as the drive torque of the vehicle 10 to the driving wheels 16.

Referring back to FIG. 1, the vehicle 10 includes a wheel brake device 87 which is a brake device that applies a wheel brake torque (=brake torque) to vehicle wheels (the driving wheels 16 and driven wheels which are not illustrated). The wheel brake device 87 supplies a brake oil pressure (=braking oil pressure) to a wheel cylinder which is provided in the wheel brake according to a driver's braking operation (for example, an operation of a brake pedal). In the wheel brake device 87, a brake fluid pressure (=master cylinder oil pressure) with a magnitude which corresponds to a depression force of the brake pedal and which is generated by a brake master cylinder is directly supplied as a braking oil pressure to the wheel cylinder in a normal state. On the other hand, in the wheel brake device 87, a braking oil pressure required for various types of control is supplied to the wheel cylinder separately from the braking oil pressure corresponding to the depression force at the time of control such as that of an anti-lock brake system (ABS), traction control (TRC), or vehicle stability control (VSC). An ABS is a system that controls braking oil pressures of the wheels to prevent locking of the wheels in order to secure stability of the vehicle 10 at the time of braking due to a sudden braking operation or at the time of braking on a slippery road. TRC is a system that controls a braking oil pressure and a driving force of the driving wheels 16 such that slippage of the driving wheels 16 is curbed and a driving force based on a surface condition is secured in order to secure stability of the vehicle 10 at the time of starting/accelerating on a slippery road or at the time of accelerating while turning. VSC is a system that controls a braking oil pressure and a driving force of each wheel such that rear-wheel skid or front-wheel skid is reduced in order to secure stability in a turning direction of the vehicle 10.

The vehicle 10 includes an electronic control unit 100 serving as a controller including the control device for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a supercharging pressure Pchg, an intake air temperature THair, a throttle valve opening θth, an engine rotation speed Ne, an output rotation speed No corresponding to a vehicle speed V, wheel speeds Nwdl, Nwdr, Nwsl, and Nwsr which are wheel speeds Nw of the right and left driving wheels 16 and the right and left driven wheels which are not illustrated, an MG1 rotation speed Ng which is the rotation speed of the first rotary machine MG1, an MG2 rotation speed Nm which is the rotation speed of the second rotary machine MG2, an MG1 temperature THg which is a temperature of the first rotary machine MG1, for example, a stator temperature, an MG2 temperature THm which is a temperature of the second rotary machine MG2, for example, a stator temperature, an accelerator opening θacc which is an accelerator operation amount by a driver indicating the magnitude of the driver's acceleration operation, a battery temperature THbat which is a temperature of the battery 54, a battery charging/discharging current Ibat, and a battery voltage Vbat) based on detection values from various sensors (for example, an air flowmeter 34, a supercharging pressure sensor 40, an intake air temperature sensor 42, a throttle valve opening sensor 44, an engine rotation speed sensor 88, an output rotation speed sensor 90, wheel speed sensors 91, an MG1 rotation speed sensor 92, an MG2 rotation speed sensor 94, an MG1 temperature sensor 95, an MG2 temperature sensor 96, an accelerator opening sensor 97, and a battery sensor 98) which are provided in the vehicle 10. The electronic control unit 100 outputs various command signals (for example, an engine control command signal Se for controlling the engine 12, a rotary machine control command signal Smg for controlling the first rotary machine MG1 and the second rotary machine MG2, a hydraulic pressure control command signal Sp for controlling the operating states of the clutch C1 and the brake B1, and a brake control command signal Sb for controlling a wheel brake torque) to various devices (for example, the engine control device 50, the inverter 52, the hydraulic pressure control circuit 84, and the wheel brake device 87) which are provided in the vehicle 10.

The electronic control unit 100 calculates a state of charge (SOC) value SOC [%] which is a value indicating the state of charge of the battery 54, for example, based on the battery charging/discharging current Ibat and the battery voltage Vbat. The electronic control unit 100 calculates chargeable and dischargeable powers Win and Wout for defining a feasible range of a battery power Pbat which is the power of the battery 54, for example, based on the battery temperature THbat and the state of charge value SOC of the battery 54. The chargeable and dischargeable powers Win and Wout include a chargeable power Win which is a possible input power for defining limitation of an input power of the battery 54 and a dischargeable power Wout which is a possible output power for defining limitation of an output power of the battery 54. For example, the chargeable and dischargeable powers Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the SOC value SOC increases in an area in which the SOC value SOC is high. For example, the dischargeable power Wout decreases as the SOC value SOC decreases in an area in which the SOC value SOC is low.

The electronic control unit 100 includes a hybrid control means, that is, a hybrid control unit 102, that realizes various types of control in the vehicle 10.

The hybrid control unit 102 has a function of an engine control means, that is, an engine control unit 102a, that controls the operation of the engine 12, a function of a rotary machine control means, that is, a rotary machine control unit 102b, that controls the operations of the first rotary machine MG1 and the second rotary machine MG2 via the inverter 52, and a function of a power transmission switching means, that is, a power transmission switching unit 102c, that switches a power transmission state in the gear shifting unit 58, and performs hybrid drive control or the like using the engine 12, the first rotary machine MG1, and the second rotary machine MG2 based on such control functions.

The hybrid control unit 102 calculates a required drive torque Twdem which is a drive torque Tw required for the vehicle 10, for example, by applying the accelerator opening θacc and the vehicle speed V to a driving force map which is a relationship which is acquired and stored in advance by experiment or design, that is, a predetermined relationship. In other words, the required drive torque Twdem is a required drive power Pwdem at the vehicle speed V at that time. Here, the output rotation speed No or the like may be used instead of the vehicle speed V. As the driving force map, for example, a map for forward travel and a map for reverse travel are separately set.

The hybrid control unit 102 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54 or the like.

For example, when the vehicle travels in the HV travel mode, the engine control command signal Se is a command value of an engine power Pe for outputting a target engine torque Tetgt at a target engine rotation speed Netgt in consideration of the optimal engine operating point OPengf and the like and realizing the required engine power Pedem in consideration of the required charging/discharging power, charging/discharging efficiency in the battery 54, and the like in addition to the required drive power Pwdem. The rotary machine control command signal Smg is a command value of a generated electric power Wg of the first rotary machine MG1 that outputs the MG1 torque Tg at the MG1 rotation speed Ng at the time of outputting a command as a reaction torque for causing the engine rotation speed Ne to reach a target engine rotation speed Netgt and is a command value of power consumption Wm of the second rotary machine MG2 that outputs the MG2 torque Tm at the MG2 rotation speed Nm at the time of outputting a command. For example, the MG1 torque Tg in the HV travel mode is calculated by feedback control in which the first rotary machine MG1 operates such that the engine rotation speed Ne reaches the target engine rotation speed Netgt. For example, the MG2 torque Tm in the HV travel mode is calculated such that the required drive torque Twdem is acquired by addition to a value corresponding to a drive torque Tw based on the engine direct-transmitted torque Td. The optimal engine operating point OPengf is determined in advance, for example, as an engine operating point OPeng at which total fuel efficiency in the vehicle 10 is the best in consideration of charging/discharging efficiency in the battery 54 in addition to the fuel efficiency of only the engine 12 when the required engine power Pedem is realized. The target engine rotation speed Netgt is a target value of the engine rotation speed Ne, that is, a target rotation speed of the engine 12, and the target engine torque Tetgt is a target value of the engine torque Te. The engine power Pe is an output, that is, power, of the engine 12 and the required engine power Pedem is an output required for the engine 12. In this way, the vehicle 10 is a vehicle in which the MG1 torque Tg which is a reaction torque of the first rotary machine MG1 is controlled such that the engine rotation speed Ne reaches the target engine rotation speed Netgt.

Figure 4:
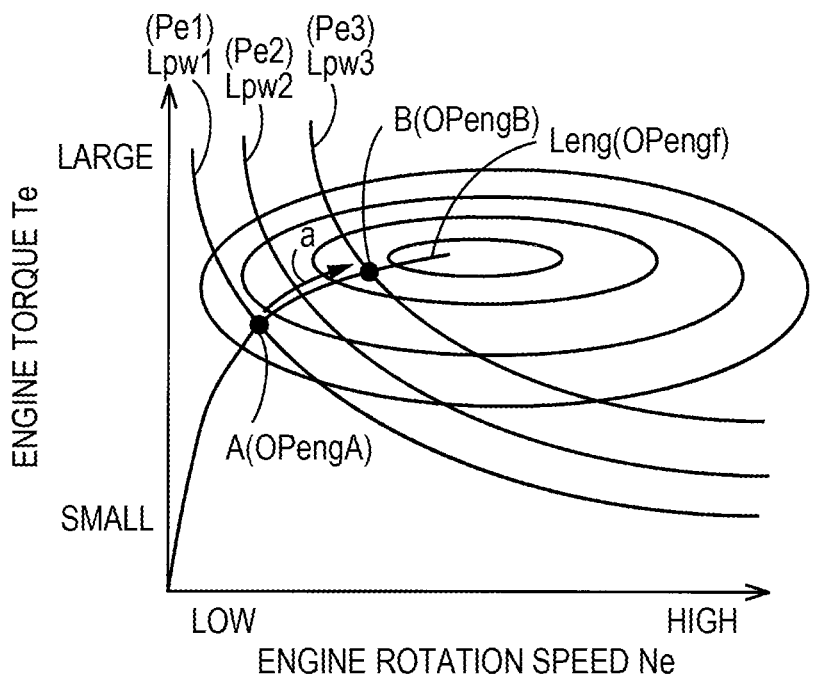
FIG. 4 is a diagram illustrating an example of an optimal engine operating point.

FIG. 4 is a diagram illustrating an example of the optimal engine operating point OPengf on a two-dimensional coordinate system with the engine rotation speed Ne and the engine torque Te as variables. In FIG. 4, a solid line Leng denotes a group of optimal engine operating points OPengf. Equi-power lines Lpw1, Lpw2, and Lpw3 denote examples in which the required engine power Pedem is required engine powers Pe1, Pe2, and Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A and B are also target values of the engine operating point OPeng which is expressed by the target engine rotation speed Netgt and the target engine torque Tetgt, that is, a target engine operating point OPengtgt which is a target operating point. For example, when the target engine operating point OPengtgt changes from the point A to the point B with an increase in the accelerator opening θacc, the engine operating point OPeng is controlled such that it changes on a path a passing through the optimal engine operating points OPengf.

The hybrid control unit 102 selectively sets up the EV travel mode or the HV travel mode as the travel mode according to the travel conditions and causes the vehicle 10 to travel in the corresponding travel mode. For example, the hybrid control unit 102 sets up the EV travel mode in a motor-driven travel area in which the required drive power Pwdem is less than a predetermined threshold value, and sets up the HV travel mode in a hybrid travel area in which the required drive power Pwdem is equal to or greater than the predetermined threshold value. Even when the required drive power Pwdem is in the motor-driven travel area, the hybrid control unit 102 sets up the HV travel mode when the SOC value SOC of the battery 54 is less than a predetermined engine start threshold value or when warming-up of the engine 12 is necessary. The engine start threshold value is a predetermined threshold value for determining whether the SOC value SOC indicates that the battery 54 needs to be charged by forcibly starting the engine 12.

Figure 5:
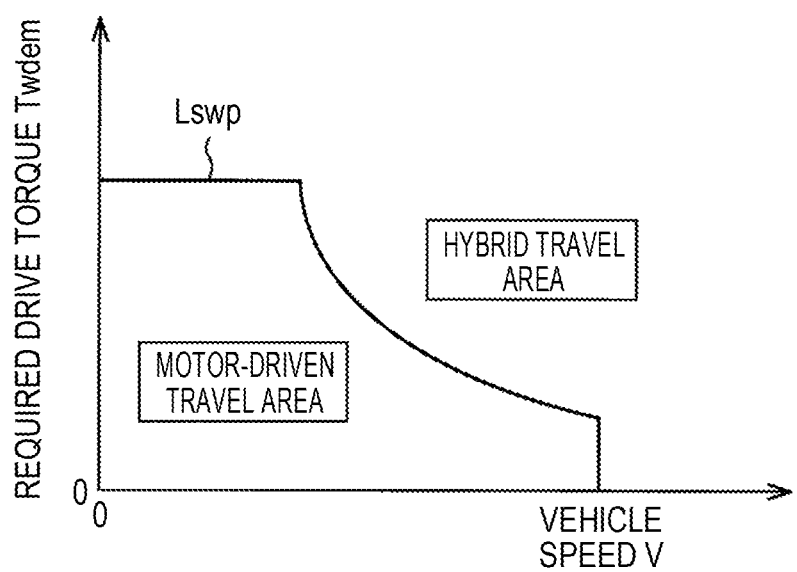
FIG. 5 is a diagram illustrating an example of a power source switching map which is used for switching control between motor-driven travel and hybrid travel.

FIG. 5 is a diagram illustrating an example of a power source switching map which is used for switching control between motor-driven travel and hybrid travel. In FIG. 5, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high, the required drive torque Twdem is relatively great, and the required drive power Pwdem is relatively great is defined in advance in the hybrid travel area. When the SOC value SOC of the battery 54 is less than the engine-start threshold value or when warming-up of the engine 12 is necessary, the motor-driven travel area in FIG. 5 may be changed to the hybrid travel area.

When the EV travel mode is set up and the required drive power Pwdem can be realized by only the second rotary machine MG2, the hybrid control unit 102 sets up a single-motor-driven EV mode. On the other hand, when the EV travel mode is set up and the required drive power Pwdem cannot be realized by only the second rotary machine MG2, the hybrid control unit 102 sets up a two-motor-driven EV mode. Although the required drive power Pwdem can be realized by only the second rotary machine MG2, the hybrid control unit 102 may set up the two-motor-driven EV mode when use of both the first rotary machine MG1 and the second rotary machine MG2 is more efficient than use of only the second rotary machine MG2.

The hybrid control unit 102 controls engagements of the clutch C1 and the brake B1 based on the set-up travel mode. The hybrid control unit 102 outputs a hydraulic pressure control command signal Sp for engaging and/or disengaging the clutch C1 and the brake B1 to the hydraulic pressure control circuit 84 such that transmission of power for travel in the set-up travel mode becomes possible.

Figures 6, 7:
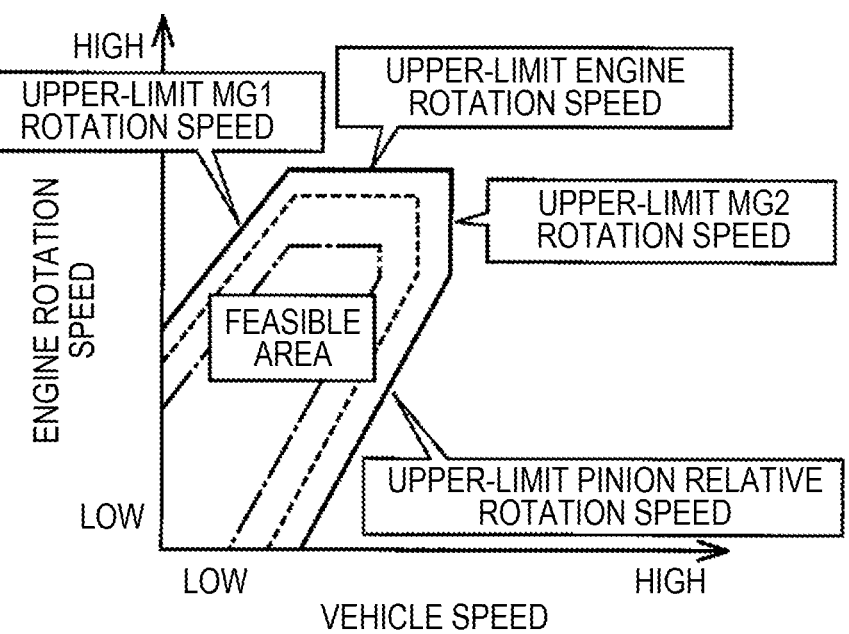
FIG. 6 is a table illustrating operating states of a clutch and a brake in each travel mode.
FIG. 7 is a diagram illustrating an example of a feasible area of an engine rotation speed.

FIG. 6 is a table illustrating operating states of the clutch C1 and the brake B1 in the travel modes. In FIG. 6, mark O denotes engagement of the clutch C1 and the brake B1, a blank denotes disengagement, and mark Δ denotes that one thereof is engaged at the time of use of an engine brake together for switching the engine 12 in a rotation stopped state to a corotating state. "G" denotes that the first rotary machine MG1 serves mainly as a generator, and "M"

denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including the single-motor-driven EV mode and the two-motor-driven EV mode.

The single-motor-driven EV mode is realized in a state in which both the clutch C1 and the brake B1 are disengaged. In the single-motor-driven EV mode, the clutch C1 and the brake B1 are disengaged and thus the gear shifting unit 58 falls into a neutral state. When the gear shifting unit 58 is in the neutral state, the differential unit 60 falls into a neutral state in which a reaction torque of the MG1 torque Tg is not taken in the second carrier CA2 connected to the first ring gar R1. In this state, the hybrid control unit 102 causes the second rotary machine MG2 to output the MG2 torque Tm for travel (see a dotted line Lm1 in FIG. 3). In the single-motor-driven EV mode, reverse travel may be performed by rotating the second rotary machine MG2 oppositely to the rotating direction at the time of forward travel.

In the single-motor-driven EV mode, since the first ring gear R1 is corotated with the second carrier CA2 but the gear shifting unit 58 is in the neutral state, the engine 12 is not corotated but is stopped with zero rotation. Accordingly, when regeneration control is performed in the second rotary machine MG2 during travel in the single-motor-driven EV mode, it is possible to take a large amount of regeneration. When the battery 54 is fully charged and regenerative energy is not taken during travel in the single-motor-driven EV mode, it is conceivable that the engine brake be used together. When the engine brake is used together, the brake B1 or the clutch C1 is engaged (see "USE IN COMBINATION WITH ENGINE BRAKE" in FIG. 6). When the brake B1 or the clutch C1 is engaged, the engine 12 is corotated and the engine brake operates.

The two-motor-driven EV mode is realized in a state in which both the clutch C1 and the brake B1 are engaged. In the two-motor-driven EV mode, since the clutch C1 and the brake B1 are engaged, rotation of the rotary elements of the first planetary gear mechanism 80 is stopped, the engine 12 is stopped with zero rotation, and rotation of the second carrier CA2 connected to the first ring gear R1 is stopped. When rotation of the second carrier CA2 is stopped, a reaction torque of the MG1 torque Tg is taken in the second carrier CA2, and thus the MG1 torque Tg can be mechanically output from the second ring gear R2 and be transmitted to the driving wheels 16. In this state, the hybrid control unit 102 causes the first rotary machine MG1 and the second rotary machine MG2 to output the MG1 torque Tg and the MG2 torque Tm for travel (see the dotted line Lm2 in FIG. 3). In the two-motor-driven EV mode, both the first rotary machine MG1 and the second rotary machine MG2 can be reversely rotated to travel reversely at the time of forward travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 falls into a directly coupled state. Accordingly, rotation of the engine 12 is transmitted from the first ring gear R1 to the second carrier CA2 at a constant speed. A high state of the HV travel mode is realized in a state in which the brake B1 is engaged and the clutch C1 is disengaged. In the high state of the HV travel mode, since the brake B1 is engaged, rotation of the first sun gear S1 is stopped and the gear shifting unit 58 falls into an overdrive state. Accordingly, rotation of the engine 12 increases and is transmitted from the first ring gear R1 to the second carrier CA2. In the HV travel mode, the hybrid control unit 102 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1 (see a solid line Lef in FIG. 3). In the HV travel mode, for example, in the low state of the HV travel mode, the second rotary machine MG2 can also be reversely rotated to travel reversely at the time of forward travel (see a solid line Ler in FIG. 3). In the I-TV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

Here, the hybrid control unit 102 controls the engine 12 and the first rotary machine MG1 such that the engine rotation speed Ne does not exceed an upper-limit engine rotation speed Nelim and the MG1 rotation speed Ng does not exceed an upper-limit MG1 rotation speed Nglim. The upper-limit engine rotation speed Nelim is, for example, a predetermined upper-limit rotation speed for making it difficult to decrease the performance of the engine 12, which is defined as a predetermined rating of the engine 12. The upper-limit MG1 rotation speed Nglim is, for example, a predetermined upper-limit rotation speed for making it difficult to decrease the performance of the first rotary machine MG1, which is defined as a predetermined rating of the first rotary machine MG1. Since the engine rotation speed Ne or the MG1 rotation speed Ng is associated with each other as can be clearly understood from the diagram illustrated in FIG. 3, the MG1 rotation speed Ng can be made not to exceed the upper-limit MG1 rotation speed Nglim in addition to the engine rotation speed Ne, for example, by defining a feasible area of the engine rotation speed Ne.

FIG. 7 is a diagram illustrating an example of a feasible area of the engine rotation speed Ne on a two-dimensional coordinate system with the vehicle speed V and the engine rotation speed Ne as variables. In FIG. 7, when the engine rotation speed Ne increases in a low area of the vehicle speed, that is, the output rotation speed No, the MG1 rotation speed Ng exceeds the upper-limit MG1 rotation speed Nglim before the engine rotation speed Ne exceeds the upper-limit engine rotation speed Nelim, and thus a feasible area of the engine rotation speed Ne is defined according to the upper-limit MG1 rotation speed Nglim. As the vehicle speed V increases, the feasible area of the engine rotation speed Ne which is defined according to the upper-limit MG1 rotation speed Nglim is enlarged to a high-rotation side of the engine rotation speed Ne. However, since a predetermined upper-limit rotation speed is defined in the engine 12, the feasible area of the engine rotation speed Ne is defined according to the upper-limit engine rotation speed Nelim in a middle vehicle-speed area. On the other hand, when the output rotation speed No increases in the low area of the engine rotation speed Ne, a relative rotation speed of the second pinion P2 which is the absolute value of a rotation speed difference between an autorotation speed of the second pinion P2 and the rotation speed of the second carrier CA2 corresponding to the engine rotation speed Ne, that is, a revolution speed of the second pinion P2 increases and thus the feasible area of the engine rotation speed Ne is defined according to an upper-limit rotation speed of the relative rotation speed of the second pinion P2. The upper-limit rotation speed of the relative rotation speed of the second pinion P2 is, for example, a predetermined upper-limit rotation speed for making it difficult to decrease the performance of the second pinion P2. As the engine rotation speed Ne increases, the feasible area of the engine rotation speed Ne which is defined according to the upper-limit rotation speed of the relative rotation speed of the second pinion P2 is enlarged to a high vehicle-speed side. However, since a predetermined upper-limit rotation speed is defined in the second rotary machine MG2, the feasible area of the engine rotation speed Ne is defined according to an upper-limit MG2 rotation speed Nmlim in a high vehicle-speed area. The upper-limit MG2 rotation speed Nmlim is, for example, a predetermined upper-limit rotation speed for making it difficult to decrease the performance of the second rotary machine MG2, which is defined as a predetermined rating of the second rotary machine MG2.

When the engine rotation speed Ne does not exceed the upper-limit rotation speed in the feasible area of the engine rotation speed Ne as illustrated in FIG. 7, the engine rotation speed Ne cannot exceed the upper-limit engine rotation speed Nelim and the MG1 rotation speed Ng cannot exceed the upper-limit MG1 rotation speed Nglim. In this embodiment, in order for the engine rotation speed Ne not to exceed the upper-limit engine rotation speed Nelim and in order for the MG1 rotation speed Ng not to exceed the upper-limit MG1 rotation speed Nglim, the hybrid control unit 102 more appropriately performs control such that the engine rotation speed Ne is within a range which is not greater than a maximum rotation speed Nemax of the engine rotation speed Ne set lower by a margin $\alpha$ than the upper-limit rotation speed in the feasible area of the engine rotation speed Ne. The margin $\alpha$ is, for example, a margin of the engine rotation speed Ne which is determined in advance such that the engine rotation speed Ne and the MG1 rotation speed Ng do not exceed the predetermined upper-limit rotation speeds thereof. Since the engine 12 is controlled within a range which is not greater than the maximum rotation speed Nemax, the first rotary machine MG1 is controlled within a range which is not greater than a maximum rotation speed Ngmax of the MG1 rotation speed Ng which is set to be lower by a margin $\beta$ than the upper-limit MG1 rotation speed Nglim. The margin $\beta$ is, for example, a margin of the MG1 rotation speed Ng which is determined in advance such that the MG1 rotation speed Ng does not exceed the upper-limit MG1 rotation speed Nglim.

The MG2 rotation speed Nm is controlled within a range which is not greater than a maximum rotation speed Nmmax of the MG2 rotation speed Nm which is set to be lower by a margin $\gamma$ than the upper-limit MG2 rotation speed Nmlim such that the MG2 rotation speed Nm for defining the feasible area in a high vehicle-speed area does not appropriately exceed the upper-limit MG2 rotation speed Nmlim. The margin $\gamma$ is, for example, a margin of the MG2 rotation speed Nm which is determined in advance such that the MG2 rotation speed Nm does not exceed the upper-limit MG2 rotation speed Nmlim. The same is true of the relative rotation speed of the second pinion P2.

The feasible areas of the engine 12, the second rotary machine MG2, and the like are defined according to the predetermined upper-limit rotation speeds of the engine 12, the second rotary machine MG2, and the like as indicated by a solid line in FIG. 7. More appropriately, the feasible areas of the engine 12, the second rotary machine MG2, and the like are defined according to the maximum rotation speeds of the engine 12, the second rotary machine MG2, and the like, for example, as indicated by a dotted line in FIG. 7. For example, the feasible area surrounded by the dotted line in FIG. 7 is an area in which a high rotation limited area for limiting use of a high rotation-speed area at the vicinity of the predetermined upper-limit rotation speed or at the predetermined upper-limit rotation speed is set with respect to the feasible area surrounded by the solid line in FIG. 7.

The above-mentioned target engine operating point OPengtgt is set as an engine operating point OPeng for realizing the required engine power Pedem, and is set in consideration that the engine rotation speed Ne is within a range which is not greater than the maximum rotation speed Nemax. The hybrid control unit 102 controls the engine 12 and the first rotary machine MG1 such that the engine operating point OPeng reaches the target engine operating point OPengtgt which is set such that the engine rotation speed Ne is within a range not greater than the maximum rotation speed Nemax with a margin (=margin $\alpha$) of the engine rotation speed Ne from the predetermined upper-limit rotation speeds of the engine 12 and the first rotary machine MG1 and which is set such that the required engine power Pedem is output from the engine 12. Control of the engine 12 is, for example, control of the engine torque Te for outputting the target engine torque Tetgt. Control of the first rotary machine MG1 is, for example, control of the MG1 torque Tg by feedback control for operating the first rotary machine MG1 such that the engine rotation speed Ne reaches the target engine rotation speed Netgt.

In the vehicle 10, there is a likelihood of falling into a high-rotation state in which the MG2 rotation speed Nm reaches the upper-limit MG2 rotation speed Nmlim depending on a vehicle state. On the other hand, in order to prevent the MG2 rotation speed Nm from entering such a high-rotation state, it is conceivable that the engine torque Te is decreased when the MG2 rotation speed Nm is greater than the maximum rotation speed Nmmax with a margin from the MG2 rotation speed Nm with respect to the upper-limit MG2 rotation speed Nmlim. Since the engine 12 includes the supercharger 18, a response delay of the engine torque Te occurs due to a response delay of the supercharging pressure Pchg, and there is concern of falling into a high-rotation state in which the MG2 rotation speed Nm is likely to reach the upper-limit MG2 rotation speed Nmlim even when the engine 12 is controlled such that the engine torque Te is decreased. It is conceived that the maximum rotation speed Nmmax is set to a low value in order for the MG2 rotation speed Nm to make it difficult to enter such a high-rotation speed, but there is concern that the decrease in the engine torque Te is advanced to cause a decrease in power performance in this case.

Specifically, the electronic control unit 100 further includes a condition determining means, that is, a condition determining unit 104, a high rotation preventing means, that is, a high rotation preventing unit 106, and a rotation speed setting means, that is, a rotation speed setting unit 108 in order to realize a control function capable of curbing a decrease in power performance due to a decrease in the engine torque Te with the MG2 rotation speed Nm being greater than the maximum rotation speed Nmmax and preventing the MG2 rotation speed Nm from falling into a high-rotation state.

The condition determining unit 104 determines whether the MG2 rotation speed Nm exceeds the maximum rotation speed NMmax.

When the condition determining unit 104 determines that the MG2 rotation speed Nm exceeds the maximum rotation speed Nmmax, the high rotation preventing unit 106 outputs a command for decreasing the engine torque Te to the hybrid control unit 102 such that the MG2 rotation speed Nm does not reach the upper-limit MG2 rotation speed Nmlim. The hybrid control unit 102 decreases the engine torque Te, for example, by performing at least one torque-down control of decreasing an opening of the electronic throttle valve 38 and delaying an ignition time. Alternatively, the hybrid control unit 102 decreases the engine torque Te, for example, by performing fuel-cut control for stopping supply of fuel to the engine 12.

When the condition determining unit 104 determines that the MG2 rotation speed Nm exceeds the maximum rotation speed Nmmax, the high rotation preventing unit 106 may additionally output a command for performing a braking operation using the wheel brake device 87 that can apply a wheel brake torque to the driving wheels 16 such that the MG2 rotation speed Nm does not reach the upper-limit MG2 rotation speed Nmlim. The braking operation using the wheel brake device 87 is high rotation preventing control using the wheel brake device 87 and corresponds to, for example, a braking operation using control of TRC, VSC, or the like.

When the condition determining unit 104 determines that the MG2 rotation speed Nm exceeds the maximum rotation speed Nmmax, the high rotation preventing unit 106 may additionally output a command for decreasing the MG2 torque Tm on a powering side such that the MG2 rotation speed Nm does not reach the upper-limit MG2 rotation speed Nmlim to the hybrid control unit 102. The hybrid control unit 102 decreases the MG2 torque Tm on a powering side, for example, by performing torque-down control for decreasing a powering torque of the second rotary machine MG2. Alternatively, the hybrid control unit 102 decreases the MG2 torque Tm on the powering side, for example, by performing regenerative brake control for generating a regenerative torque of the second rotary machine MG2. Alternatively, the hybrid control unit 102 decreases the MG2 torque Tm on the powering side, for example, by performing MG2 torque cut control for stopping outputting of the MG2 torque Tm. Control for decreasing the MG2 torque Tm on the powering side is high rotation preventing control using the second rotary machine MG2 and is particularly useful at the time of idling of the driving wheels 16.

When the engine torque Te is decreased with the MG2 rotation speed Nm exceeding the maximum rotation speed Nmmax, a response delay of the engine torque Te due to a response delay of the supercharging pressure Pchg is more likely to occur when the supercharging pressure Pchg from the supercharger 18 is high than when the supercharging pressure Pchg is low. Accordingly, when the supercharging pressure Pchg is high, the MG2 rotation speed Nm is more likely to reach the upper-limit MG2 rotation speed Nmlim due to the response delay of the supercharging pressure Pchg than when the supercharging pressure is low.

The rotation speed setting unit 108 sets the maximum rotation speed Nmmax of the second rotary machine MG2 to a lower value when the supercharging pressure Pchg from the supercharger 18 is high than when the supercharging pressure Pchg is low.

Since an air density is greater when the intake air temperature THair is low than when the intake air temperature THair is high, the engine torque Te is likely to increase and the second rotary machine MG2 is likely to enter a high-rotation state.

When the intake air temperature THair is low, the rotation speed setting unit 108 sets the maximum rotation speed Nmmax of the second rotary machine MG2 to a lower value than when the intake air temperature THair is high.

Figure 8:
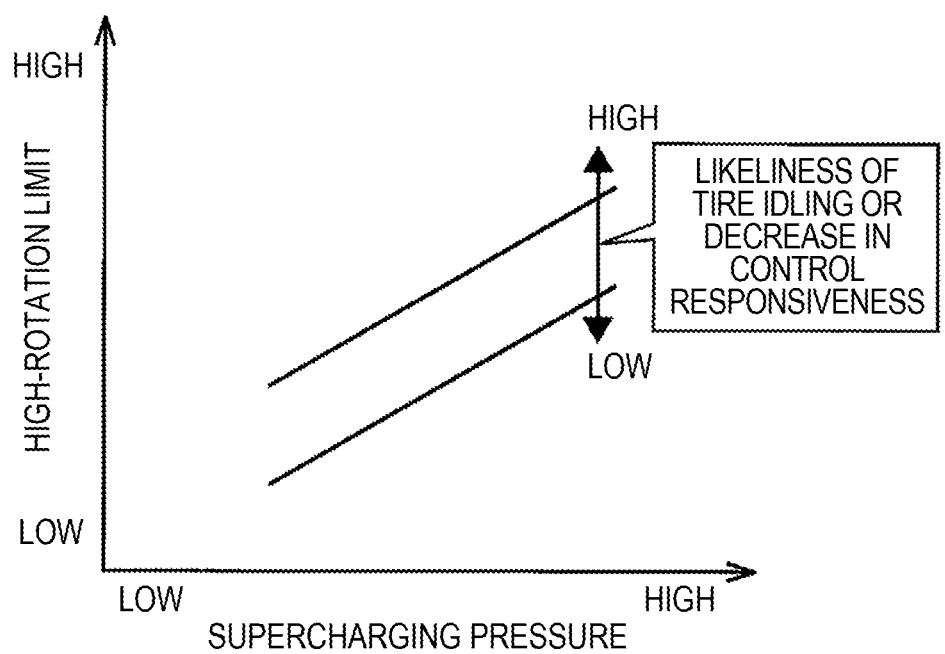
FIG. 8 is a diagram illustrating an example of a high-rotation limit which is set based on a supercharging pressure.

FIG. 8 is a diagram illustrating an example of a high-rotation limit which is set based on the supercharging pressure Pchg from the supercharger 18. The high-rotation limit indicates a limited area enlargement which is used for enlargement of a degree of enlargement of the high rotation limited area when the vehicle condition is a normal vehicle condition, that is, a limited area enlargement which is used for enlargement of the high rotation limited area, when the vehicle condition is a predetermined vehicle condition. Accordingly, as the high rotation limits of the engine 12, the second rotary machine MG2, and the like increase, the maximum rotation speeds of the engine 12, the second rotary machine MG2, and the like are set to lower values. Referring to FIG. 7, for example, the dotted line illustrated in FIG. 7 indicates a feasible area which is set by a normal high rotation limited area which is a high rotation limited area in a normal vehicle condition, that is, the maximum rotation speed in the normal vehicle condition. The alternate long and short dash line in FIG. 7 indicates a feasible area which is set by a high rotation limited area which is enlarged from a normal high rotation limited area. The normal vehicle condition is, for example, a vehicle condition in which the MG2 rotation speed Nm is less likely to reach the upper-limit MG2 rotation speed Nmlim. The predetermined vehicle condition is, for example, a vehicle condition in which the MG2 rotation speed Nm is likely to reach the upper-limit MG2 rotation speed Nmlim, that is, a vehicle condition in which the MG2 rotation speed Nm is likely to fall into a high-rotation state in which it can reach the upper-limit MG2 rotation speed Nmlim. In FIG. 8, the high-rotation limit is determined in advance to be a greater value as the supercharging pressure Pchg becomes higher. Accordingly, the maximum rotation speed Nmmax of the second rotary machine MG2 is set to a lower value as the supercharging pressure Pchg becomes higher. When the vehicle condition is the predetermined vehicle condition, the MG2 rotation speed Nm is more likely to fall into a high-rotation state than when the vehicle condition is the normal vehicle condition. When the vehicle condition is the predetermined vehicle condition, the maximum rotation speed Nmmax is set to a lower value using the high-rotation limit than when the vehicle condition is the normal vehicle condition. The high-rotation limit is used when the vehicle condition is the predetermined vehicle condition, and is kept in a constant high rotation limited area when the vehicle condition is the normal vehicle condition. That is, the maximum rotation speed Nmmax of the second rotary machine MG2 has a constant value regardless of the supercharging pressure Pchg when the vehicle condition is the normal vehicle condition.

Referring to FIG. 8, the rotation speed setting unit 108 sets the maximum rotation speed Nmmax of the second rotary machine MG2 to a lower value as the supercharging pressure Pchg becomes higher. The rotation speed setting unit 108 sets the maximum rotation speed Nmmax to a lower value when the vehicle condition is the predetermined vehicle condition than when the vehicle condition is the normal vehicle condition. The rotation speed setting unit 108 sets the maximum rotation speed Nmmax based on the supercharging pressure Pchg only when the vehicle condition is the predetermined vehicle condition.

The condition determining unit 104 determines whether the vehicle condition is the predetermined vehicle condition.

When the driving wheels 16 travel on a slippery road, that is, a slithery road, the output rotation speed No is likely to increase due to idling of the driving wheels 16 and the MG2 rotation speed Nm is also likely to increase. The slippery road is a road on which the driving wheels 16 are likely to idle and examples thereof include a low-μ road, a rough road, and an unpaved road.

The condition determining unit 104 determines whether the vehicle condition is the predetermined vehicle condition based on whether a travel road of the vehicle 10 is in a surface condition in which the driving wheels 16 are likely to idle. The condition determining unit 104 determines whether the travel road of the vehicle 10 is in a surface condition in which the driving wheels 16 are likely to idle, for example, based on whether a difference between an average wheel speed Nwd of the wheel speeds Nwdl and Nwdr of the driving wheels 16 and an average wheel speed Nws of the wheel speeds Nwsl and Nwsr of the driven wheels is greater than a predetermined slip determination threshold value for determining whether a tire slip has occurred. Alternatively, it may be determined whether the travel road of the vehicle 10 is in a surface condition in which the driving wheels 16 are likely to idle using a wheel slip rate (=(Nwd−Nws)/Nwd), rates of change of the wheel speeds Nwdl, Nwdr, Nwsl, and Nwsr, an outside air temperature, a road surface temperature, vehicle acceleration, and the like.

In other words, when the braking operation of the wheel brake device 87 is limited, for example, when an operation of TRC or VSC is limited, control responsiveness of TRC or VSC of the wheel brake device 87 decreases, the driving wheels 16 are likely to idle to increase the output rotation speed No, and the MG2 rotation speed Nm is likely to increase. Limitation of the braking operation of the wheel brake device 87 is limitation of brake performance of the wheel brake device 87, for example, limitation due to inappropriate operation of TRC or VSC or limitation due to non-operation thereof. Examples thereof include a case in which an abnormality occurs in a sensor associated with the braking operation of the wheel brake device 87 of the wheel speed sensors 91 or the like and a case in which non-operation is selected by a switch for switching between operation and non-operation of TRC or VSC.

The condition determining unit 104 determines whether the vehicle condition is the predetermined vehicle condition based on whether the braking operation of the wheel brake device 87 is limited. When an abnormality occurs in a sensor associated with the braking operation of the wheel brake device 87 or when non-operation of TRC, VSC, or the like is selected, the condition determining unit 104 determines that the braking operation of the wheel brake device 87 is limited.

In other words, when the second rotary machine MG2 is subjected to predetermined output limitation, high rotation preventing control using the second rotary machine MG2 is not appropriately performed and the MG2 rotation speed Nm is likely to increase. For example, when high rotation preventing control using the second rotary machine MG2 is performed, the predetermined output limitation is output limitation in which generation of electric power in the second rotary machine MG2 cannot be appropriately performed or output limitation in which charging of the battery 54 cannot be appropriately performed because electric power generated by the first rotary machine MG1 cannot be consumed in the second rotary machine MG2 in order to decrease the MG2 torque Tm on the powering side. Examples of the output limitation in which generation of electric power in the second rotary machine MG2 cannot be appropriately performed include a state in which the temperature of the second rotary machine MG2 is high or low such that the MG2 temperature THm departs from a predetermined normal temperature area THmra and a state in which the temperature of the battery 54 is high or low such that the battery temperature THbat departs from a predetermined normal temperature area THbatra. Examples of the output limitation in which charging of the battery 54 cannot be appropriately performed include a state in which the temperature of the battery 54 is high or low such that the battery temperature THbat departs from the predetermined normal temperature area THbatra. The predetermined normal temperature area THmra is a normal use area of the second rotary machine MG2 and is a predetermined temperature area of the second rotary machine MG2 in which the output of the second rotary machine MG2 does not decrease according to the MG2 temperature THm. The predetermined normal temperature area THbatra is a normal use area of the battery 54 and is a predetermined temperature area of the battery 54 in which the charging and discharging powers Win and Wout do not decrease according to the battery temperature THbat.

The condition determining unit 104 determines whether the vehicle condition is the predetermined vehicle condition based on whether the second rotary machine MG2 is subjected to the predetermined output limitation. When the MG2 temperature THm or the battery temperature THbat departs from the corresponding predetermined normal temperature area thereof, the condition determining unit 104 determines that the second rotary machine MG2 is subjected to the predetermined output limitation.

When the condition determining unit 104 determines that the vehicle condition is not the predetermined vehicle condition, the rotation speed setting unit 108 sets the normal high rotation limited area, that is, sets the maximum rotation speed for a normal vehicle condition, that is, the maximum rotation speed Nmmax of the second rotary machine MG2. When the condition determining unit 104 determines that the vehicle condition is the predetermined vehicle condition, for example, the rotation speed setting unit 108 calculates the high-rotation limit amount (=limited area enlargement amount) based on the supercharging pressure Pchg using the high-rotation limit map illustrated in FIG. 8 and performs enlargement of the normal high rotation limited area, that is, sets the maximum rotation speed for the predetermined vehicle condition which is a value lower than that for the normal vehicle condition, that is, the maximum rotation speed Nmmax of the second rotary machine MG2. In this way, when the condition determining unit 104 determines that the vehicle condition is the predetermined vehicle condition, the rotation speed setting unit 108 sets the maximum rotation speed Nmmax to a lower value than when the condition determining unit 104 determines that the vehicle condition is not the predetermined vehicle condition. Only when the condition determining unit 104 determines that the vehicle condition is the predetermined vehicle condition, the rotation speed setting unit 108 sets the maximum rotation speed Nmmax based on the supercharging pressure Pchg.

As the driving wheels 16 are more likely to idle, the MG2 rotation speed Nm is more likely to increase. Accordingly, as illustrated in FIG. 8, as the driving wheels 16 are more likely to idle, the high-rotation limit based on the supercharging pressure Pchg is determined to be a greater value in advance. The likelihood of the driving wheels 16 idling increases as the difference between the wheel speeds Nwdl and Nwdr of the driving wheels 16 and the wheel speeds Nwsl and Nwsr of the driven wheels increases. Alternatively, the likelihood of the driving wheels 16 idling may increase as the outside air temperature decreases, as the road surface temperature decreases, or as the road surface μ value decreases. When the likelihood of the driving wheels 16 idling is high, it means that the likelihood that the MG2 rotation speed Nm will reach the upper-limit MG2 rotation speed Nmlim is high. As the likelihood that the MG2 rotation speed Nm will reach the upper-limit MG2 rotation speed Nmlim increases, the MG2 rotation speed Nm is likely to fall into the high-rotation state.

As a degree of limitation of the braking operation of the wheel brake device 87 increases, that is, as a degree of decrease of control responsiveness of TRC or VSC using the wheel brake device 87 increases, the MG2 rotation speed Nm is likely to increase. Accordingly, as illustrated in FIG. 8, the high-rotation limit based on the supercharging pressure Pchg is determined to be a greater value in advance as the degree of decrease of control responsiveness of TRC or VSC using the wheel brake device 87 becomes greater. The degree of decrease of control responsiveness of TRC or VSC using the wheel brake device 87 is the highest, for example, when TRC, VSC, or the like is not operated. When the degree of decrease of control responsiveness of TRC or VSC using the wheel brake device 87 is high, it means that the likelihood that the MG2 rotation speed Nm will reach the upper-limit MG2 rotation speed Nmlim is high.

As the degree of output limitation of the second rotary machine MG2 increases, that is, as a degree of decrease of control responsiveness of high rotation preventing control using the second rotary machine MG2 increases, the MG2 rotation speed Nm is likely to increase. Accordingly, as illustrated in FIG. 8, the high-rotation limit based on the supercharging pressure Pchg is determined to be a greater value in advance as the degree of decrease of control responsiveness of high rotation preventing control using the second rotary machine MG2 becomes greater. The degree of decrease of control responsiveness of high rotation preventing control using the second rotary machine MG2 increases, for example, as the MG2 temperature THm increases or decreases outside the predetermined normal temperature area THmra or as the battery temperature THbat increases or decreases outside the predetermined normal temperature area THbatra. When the degree of decrease of control responsiveness of high rotation preventing control using the second rotary machine MG2 is high, it means that the likelihood that the MG2 rotation speed Nm will reach the upper-limit MG2 rotation speed Nmlim is high.

As the vehicle condition is closer to a vehicle condition in which the likelihood that the MG2 rotation speed Nm will reach the upper-limit MG2 rotation speed Nmlim is high, the rotation speed setting unit 108 calculates a greater high-rotation limit and sets the maximum rotation speed Nmmax of the second rotary machine MG2 to a lower value.

Figure 9:
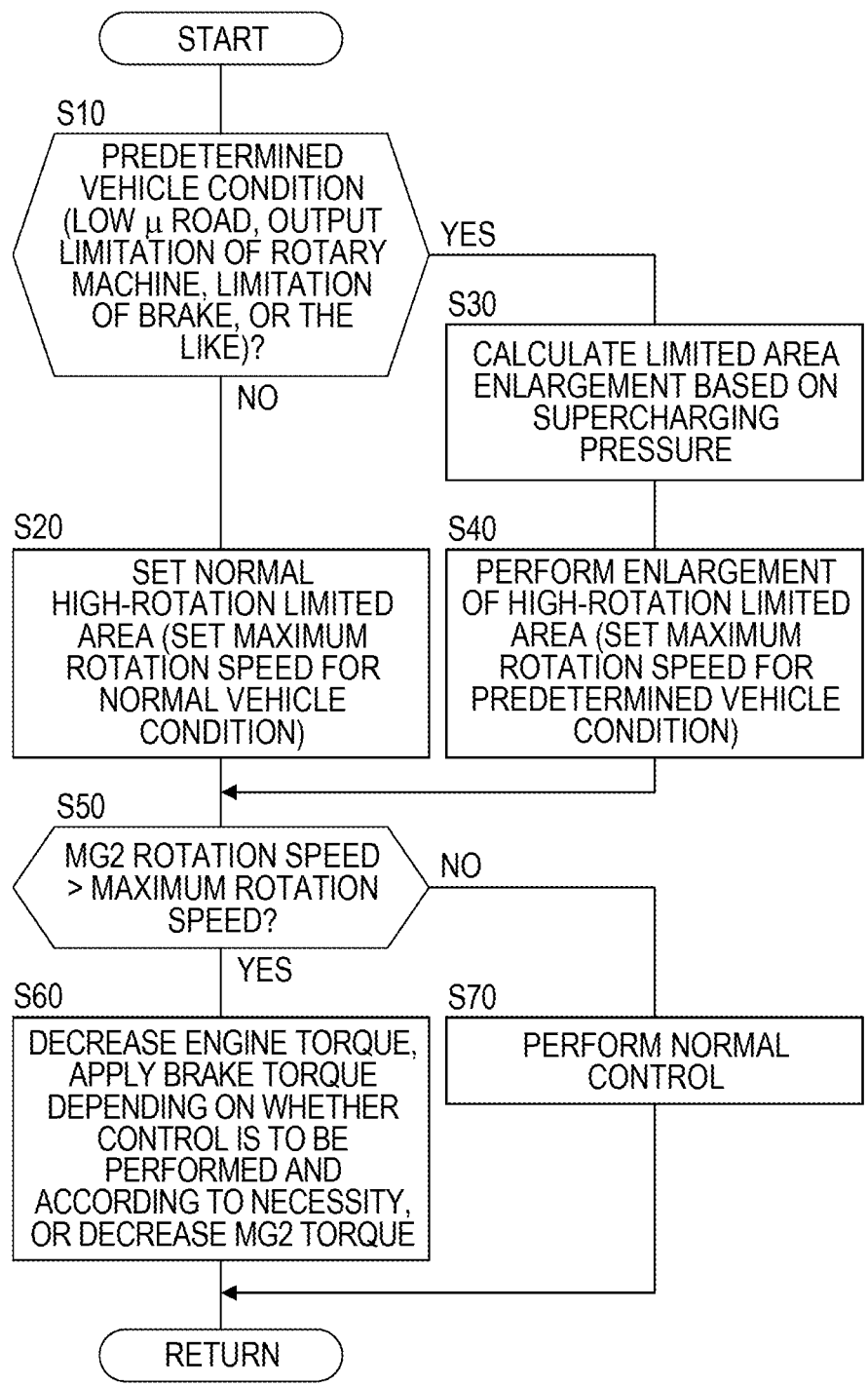
FIG. 9 is a flowchart illustrating a principal part of a control operation of an electronic control unit and illustrating a control operation for preventing a decrease in power performance due to a decrease in an engine torque and preventing a rotation speed of a second rotary machine from falling into a high-rotation state.

FIG. 9 is a flowchart illustrating a principal part of the control operation of the electronic control unit 100 and illustrating the control operation for preventing a decrease in power performance due to a decrease in the engine torque Te and preventing the MG2 rotation speed Nm from falling into a high-rotation state, which is repeatedly performed.

In FIG. 9, first, in Step (which is omitted in the following description) S10 corresponding to the function of the condition determining unit 104, it is determined whether the vehicle condition is the predetermined vehicle condition based on whether a travel road of the vehicle 10 is in a surface condition in which the driving wheels 16 are likely to idle, based on whether the second rotary machine MG2 is subjected to the predetermined output limitation, or based on whether the braking operation of the wheel brake device 87 is limited. When the determination result of S10 is negative, the normal high rotation limited area is set, that is, the maximum rotation speed Nmmax for the normal vehicle condition is set, in S20 corresponding to the function of the rotation speed setting unit 108. On the other hand, when the determination result of S10 is positive, the high-rotation limit (=limited area enlargement) based on the supercharging pressure Pchg is calculated using the high-rotation limit map illustrated in FIG. 8 in S30 corresponding to the function of the rotation speed setting unit 108. Subsequently, in S40 corresponding to the function of the rotation speed setting unit 108, enlargement of the normal high rotation limited area is performed using the calculated limited area enlargement, that is, the maximum rotation speed Nmmax for the predetermined vehicle condition is set. In S50 corresponding to the function of the condition determining unit 104 subsequent to S20 or subsequent to S40, it is determined whether the MG2 rotation speed Nm is higher than the maximum rotation speed Nmmax. When the determination result of S50 is positive, the engine torque Te is decreased by fuel-cut control or torque-down control in S60 corresponding to the function of the high rotation preventing unit 106. In S60, additionally, a wheel brake torque is applied by high rotation preventing control using the wheel brake device 87 or the MG2 torque Tm on the powering side may be decreased by high rotation preventing control using the second rotary machine MG2 according to whether high rotation preventing control is to be performed and according to necessity. When the determination result of S50 is negative, normal control of controlling the engine 12 and the first rotary machine MG1 is performed such that the engine operating point OPeng reaches the target engine operating point OPengtgt which is set such that the engine rotation speed Ne is within a range which does not exceed the maximum rotation speed Nemax and the required engine power Pedem is output from the engine 12 in S70 corresponding to the function of the hybrid control unit 102.

As described above, according to this embodiment, since the maximum rotation speed Nmmax of the second rotary machine MG2 is set to a lower value when the supercharging pressure Pchg from the supercharger 18 is high than when the supercharging pressure Pchg is low, the engine torque Te decreases at the MG2 rotation speed Nm which is relatively low and the MG2 rotation speed Nm is less likely to increase. When the supercharging pressure Pchg is relatively low and the MG2 rotation speed Nm is less likely to reach the upper-limit MG2 rotation speed Nmlim, the maximum rotation speed Nmmax is set to a relatively high value. Accordingly, the engine torque Te is not decreased to the MG2 rotation speed Nm which is relatively high and it becomes easier to appropriately secure power performance. Accordingly, it is possible to prevent a decrease in power performance due to a decrease in the engine torque Te and to prevent the MG2 rotation speed Nm from falling into a high-rotation state.

According to this embodiment, since the maximum rotation speed Nmmax is set to a lower value as the supercharging pressure Pchg becomes higher, the MG2 rotation speed Nm is less likely to appropriately increase when the supercharging pressure Pchg is relatively high and it becomes easier to appropriately secure power performance when the supercharging pressure Pchg is relatively low.

According to this embodiment, since the maximum rotation speed Nmmax is set to a lower value when it is determined that the vehicle condition is the predetermined vehicle condition than when it is determined that the vehicle condition is not the predetermined vehicle condition, the engine torque Te is decreased at the MG2 rotation speed Nm which is relatively low and the MG2 rotation speed Nm is less likely to increase.

According to this embodiment, only when it is determined that the vehicle condition is the predetermined vehicle condition, the maximum rotation speed Nmmax based on the supercharging pressure Pchg is set. Accordingly, when the MG2 rotation speed Nm is more likely to reach the upper-limit MG2 rotation speed Nmlim, the MG2 rotation speed Nm is less likely to appropriately increase. When it is determined that the vehicle condition is not the predetermined vehicle condition, the maximum rotation speed Nmmax based on the supercharging pressure Pchg is not set. Accordingly, when the MG2 rotation speed Nm is less likely to reach the upper-limit MG2 rotation speed Nmlim, it becomes easier to appropriately secure power performance. When the maximum rotation speed Nmmax based on the supercharging pressure Pchg is not set, it means that the engine torque Te decreases with the maximum rotation speed Nmmax which is a constant value regardless of the supercharging pressure Pchg as a threshold value, and it is possible to expect an effect of making it difficult to give a feeling of discomfort to a driver.

According to this embodiment, when the travel road of the vehicle 10 is in a surface condition in which the driving wheels 16 are likely to idle, it is determined that the vehicle condition is the predetermined vehicle condition and thus the MG2 rotation speed Nm is less likely to increase.

According to this embodiment, when the braking operation of the wheel brake device 87 is limited, it is determined that the vehicle condition is the predetermined vehicle condition and thus the MG2 rotation speed Nm is less likely to increase.

According to this embodiment, as the vehicle condition is closer to a vehicle condition in which the likelihood that the MG2 rotation speed Nm will reach the upper-limit MG2 rotation speed Nmlim becomes higher, the maximum rotation speed Nmmax is set to a lower value and thus the MG2 rotation speed Nm is less likely to appropriately increase.

Another embodiment of the present disclosure will be described below. In the following description, elements common to those in the above-mentioned embodiment will be referred to by the same reference signs and description thereof will not be repeated.

In this embodiment, a vehicle 200 which is different from the vehicle 10 described above in the first embodiment and which is illustrated in FIG. 10 is exemplified. FIG. 10 is a diagram schematically illustrating a configuration of a vehicle 200 to which the present disclosure is applied. In FIG. 10, the vehicle 200 is a hybrid vehicle including an engine 202, a first rotary machine MG1, a second rotary machine MG2, a power transmission device 204, driving wheels 206.

The engine 202, the first rotary machine MG1, and the second rotary machine MG2 have the same configurations as the engine 12, the first rotary machine MG1, and the second rotary machine MG2 described above in the first embodiment. The engine 202 is a travel power source of the vehicle 200 and an engine torque Te thereof is controlled by causing an electronic control unit 242 which will be described later to control an engine control device 208 including an electronic throttle valve, a fuel injection device, an ignition device, and a waste gate valve which are provided in the vehicle 200. The first rotary machine MG1 and the second rotary machine MG2 are connected to a battery 212 that is a power storage device provided in the vehicle 200 via an inverter 210 provided in the vehicle 200. An MG1 torque Tg and an MG2 torque Tm of the first rotary machine MG1 and the second rotary machine MG2 are controlled by causing the electronic control unit 242 to control the inverter 210.

A power transmission device 204 includes an electrical stepless gear shifting unit 216 and a mechanical stepped gear shifting unit 218 which are arranged in series on a common axis in a case 214 that is a non-rotary member attached to the vehicle body. The electrical stepless gear shifting unit 216 is connected to the engine 202 directly or indirectly via a damper which is not illustrated or the like. The mechanical stepped gear shifting unit 218 is connected to an output side of the electrical stepless gear shifting unit 216. The power transmission device 204 includes a differential gear unit 222 that is connected to an output shaft 220 which is an output rotary member of the mechanical stepped gear shifting unit 218 and a pair of axles 224 that is connected to the differential gear unit 222. In the power transmission device 204, power which is output from the engine 202 or the second rotary machine MG2 is transmitted to the mechanical stepped gear shifting unit 218 and is transmitted from the mechanical stepped gear shifting unit 218 to the driving wheels 206 via the differential gear unit 222 or the like. The power transmission device 204 having this configuration is suitably used for a vehicle of a front-engine rear-drive (FR) type. In the following description, the electrical stepless gear shifting unit 216 is referred to as a stepless gear shifting unit 216 and the mechanical stepped gear shifting unit 218 is referred to as a stepped gear shifting unit 218. The stepless gear shifting unit 216, the stepped gear shifting unit 218, or the like is disposed to be substantially symmetric with respect to the common axis, and a lower half with respect to the axis is not illustrated in FIG. 10. The common axis is an axis of a crankshaft of the engine 202, a connection shaft 226 connected to the crankshaft, or the like.

The stepless gear shifting unit 216 includes a differential mechanism 230 that is a power split mechanism that mechanically splits power of the engine 202 to the first rotary machine MG1 and an intermediate transmission member 228 which is an output rotary member of the stepless gear shifting unit 216. The first rotary machine MG1 is a rotary machine to which power of the engine 202 is transmitted. The second rotary machine MG2 is connected to the intermediate transmission member 228 in a power-transmittable manner. Since the intermediate transmission member 228 is connected to the driving wheels 206 via the stepped gear shifting unit 218, the second rotary machine MG2 is a rotary machine that is connected to the driving wheels 206 in a power-transmittable manner. The differential mechanism 230 is a differential mechanism that splits and transmits power of the engine 202 to the driving wheels 206 and the first rotary machine MG1. The stepless gear shifting unit 216 is an electrical stepless transmission in which a differential state of the differential mechanism 230 is controlled by controlling the operating state of the first rotary machine MG1. The first rotary machine MG1 is a rotary machine that can control an engine rotation speed Ne, that is, adjust the engine rotation speed Ne.

The differential mechanism 230 is constituted by a single-pinion type planetary gear unit and includes a sun gear S0, a carrier CA0, and a ring gear R0. The engine 202 is connected to the carrier CA0 via the connection shaft 226 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 230, the carrier CA0 serves as an input element, the sun gear S0 serves as a reaction element, and the ring gear R0 serves as an output element.

The stepped gear shifting unit 218 is a stepped transmission constituting a part of a power transmission path between the intermediate transmission member 228 and the driving wheels 206, that is, a mechanical gear shifting mechanism constituting a part of a power transmission path between the stepless gear shifting unit 216 (which is synonymous with the differential mechanism 230) and the driving wheels 206. The intermediate transmission member 228 also serves as an input rotary member of the stepped gear shifting unit 218. The stepped gear shifting unit 218 is, for example, a known planetary gear type automatic transmission including a plurality of planetary gear units such as a first planetary gear unit 232 and a second planetary gear unit 234 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when they are not particularly distinguished from each other.

Each engagement device CB is a hydraulic frictional engagement device which is constituted by a multi-disc or single-disc clutch or brake which is pressed by a hydraulic actuator, a band brake which is tightened by a hydraulic actuator, and the like. The operating state such as an engaged state or a disengaged state of each engagement device CB is switched by changing an engagement torque Tcb which is a torque capacity thereof using regulated engagement oil pressures PRcb of the engagement devices CB which are output from solenoid valves SL1 to SL4 in a hydraulic pressure control circuit 236 provided in the vehicle 200.

In the stepped gear shifting unit 218, rotary elements of the first planetary gear unit 232 and the second planetary gear unit 234 are partially connected to each other directly or indirectly via the engagement devices CB or the one-way clutch F1 or are connected to the intermediate transmission member 228, the case 214, or the output shaft 220. The rotary elements of the first planetary gear unit 232 are a sun gear S1, a carrier CA1, and a ring gear R1, and the rotary elements of the second planetary gear unit 234 are a sun gear S2, a carrier CA2, and a ring gear R2.

In the stepped gear shifting unit 218, one gear stage of a plurality of gear stages with different gear ratios γat (=AT input rotation speed Ni/AT output rotation speed No) is formed, for example, by engaging one of a plurality of engagement devices. In this embodiment, a gear stage which is formed in the stepped gear shifting unit 218 is referred to as an AT gear stage. The AT input rotation speed Ni is an input rotation speed of the stepped gear shifting unit 218 and has the same value as a rotation speed of the intermediate transmission member 228 and the same value as an MG2 rotation speed Nm. The AT output rotation speed No is a rotation speed of the output shaft 220 which is an output rotation speed of the stepped gear shifting unit 218 and is also an output rotation speed of a composite transmission 238 which is a combined transmission including the stepless gear shifting unit 216 and the stepped gear shifting unit 218.

In the stepped gear shifting unit 218, for example, as illustrated in an engagement operation table of FIG. 11, four forward AT gear stages including a first AT gear stage ("1st" in the drawing) to a fourth AT gear stage ("4th" in the drawing) are formed as a plurality of AT gear stages. The gear ratio γat of the first AT gear stage is the highest and the gear ratio γat becomes lower in a higher AT gear stage. A reverse AT gear stage ("Rev" in the drawing) is formed, for example, by engagement of the clutch C1 and engagement of the brake B2. That is, for example, the first AT gear stage is formed at the time of reverse travel. The engagement operation table illustrated in FIG. 11 is obtained by collecting relationships between the AT gear stags and the operation states of the plurality of engagement devices. In FIG. 11, "O" denotes engagement, "A" denotes engagement at the time of engine braking or at the time of coast downshift of the stepped gear shifting unit 218, and a blank denotes disengagement.

In the stepped gear shifting unit 218, an AT gear stage which is formed according to a driver's operation of an accelerator, a vehicle speed V, or the like is switched, that is, a plurality of AT gear stages are selectively formed, by an electronic control unit 242 which will be described later. For example, in gear shifting control of the stepped gear shifting unit 218, so-called clutch-to-clutch gear shifting in which gear shifting is performed by switching one of the engagement devices CB, that is, gear shifting is performed by switching of the engagement device CB between engagement and disengagement, is performed.

The vehicle 200 further includes an one-way clutch F0. The one-way clutch F0 is a lock mechanism that can fix the carrier CA0 in a non-rotatable manner. That is, the one-way clutch F0 is a lock mechanism that can fix the connection shaft 226 which is connected to the crankshaft of the engine 202 and which rotates integrally with the carrier CA0 to the case 214. In the one-way clutch F0, one member of two members rotatable relative to each other is integrally connected to the connection shaft 226 and the other member is integrally connected to the case 214. The one-way clutch F0 idles in a positive rotating direction which is a rotating direction at the time of operation of the engine 202 and is automatically engaged in a negative rotating direction which is opposite to that at the time of operation of the engine 202. Accordingly, at the time of idling of the one-way clutch F0, the engine 202 is rotatable relative to the case 214. On the other hand, at the time of engagement of the one-way clutch F0, the engine 202 is not rotatable relative to the case 214. That is, the engine 202 is fixed to the case 214 by engagement of the one-way clutch F0. In this way, the one-way clutch F0 permits rotation in the positive rotating direction of the carrier CA0 which is a rotating direction at the time of operation of the engine 202 and prohibits rotation in the negative rotating direction of the carrier CA0. That is, the one-way clutch F0 is a lock mechanism that can permit rotation in the positive rotating direction of the engine 202 and prohibit rotation in the negative rotating direction.

The vehicle 200 further includes a wheel brake device 240 which is a brake device that applies a wheel brake torque to wheels (the driving wheels 206 and driven wheels which are not illustrated). The wheel brake device 240 has the same configuration as the wheel brake device 87 described above in the first embodiment.

The vehicle 200 further includes an electronic control unit 242 which is a controller including a control device for the vehicle 200 associated with control of the engine 202, the first rotary machine MG1, the second rotary machine MG2, and the like. The electronic control unit 242 has the same configuration as the electronic control unit 100 described above in the first embodiment. The electronic control unit 242 is supplied with various signals which are the same as supplied to the electronic control unit 100. Various command signals which are the same as output from the electronic control unit 100 are output from the electronic control unit 242. The electronic control unit 242 has functions equivalent to the functions of the hybrid control unit 102, the condition determining unit 104, the high rotation preventing unit 106, and the rotation speed setting unit 108 which are included in the electronic control unit 100. The electronic control unit 242 can realize a control function capable of preventing a decrease in power performance due to a decrease in the engine torque Te and preventing a high-rotation state of the second rotary machine MG2 which is the same function as realized by the electronic control unit 100 described above in the first embodiment.

In the vehicle 200, the stepped gear shifting unit 218 is provided in series on the rear stage of the stepless gear shifting unit 216. Accordingly, when the AT gear stage of the stepped gear shifting unit 218 is switched at a certain vehicle speed V, the rotation speed of the ring gear R0 which is the output rotation speed of the stepless gear shifting unit 216 changes. Then, a feasible area of the engine rotation speed Ne changes based on a difference between the AT gear stages in the stepped gear shifting unit 218.

Figure 12:
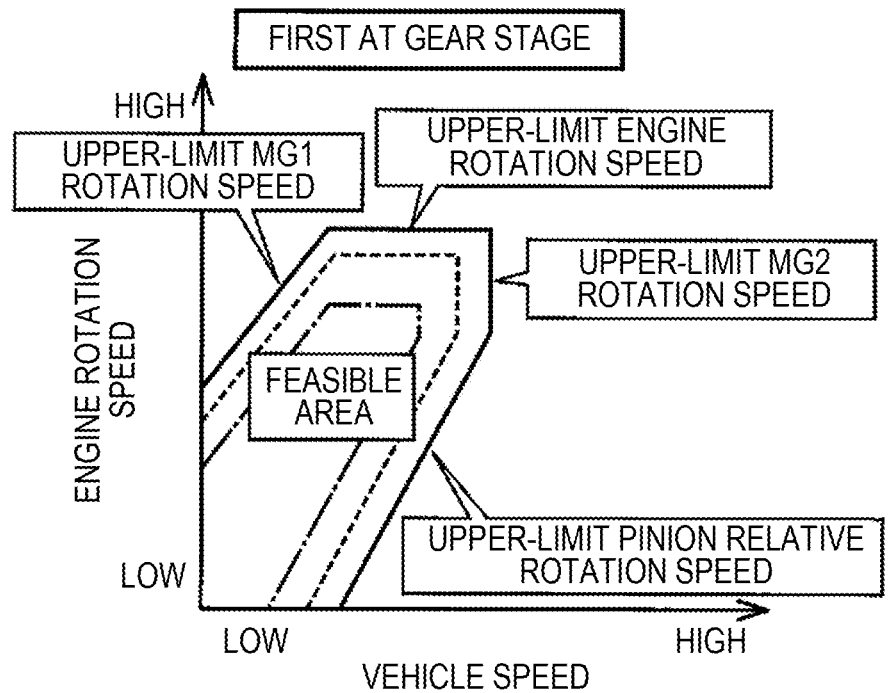
FIG. 12 is a diagram illustrating an example of a feasible area of an engine rotation speed in the vehicle illustrated in FIG. 10 at a first AT gear stage.
Figure 13:
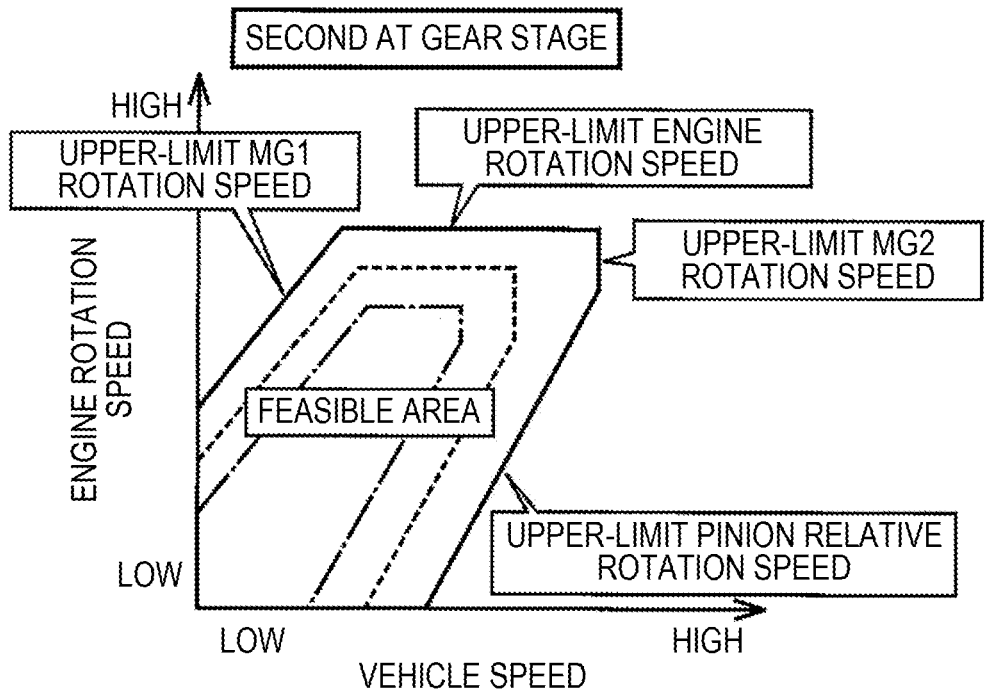
FIG. 13 is a diagram illustrating an example of a feasible area of the engine rotation speed in the vehicle illustrated in FIG. 10 at a second AT gear stage.
Figure 14:
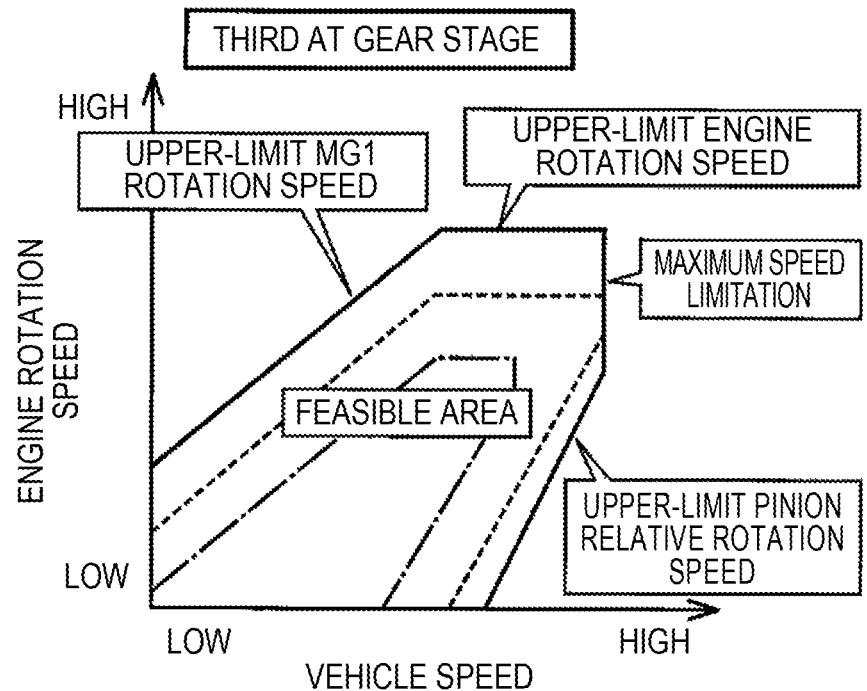
FIG. 14 is a diagram illustrating an example of a feasible area of the engine rotation speed in the vehicle illustrated in FIG. 10 at a third AT gear stage.
Figure 15:
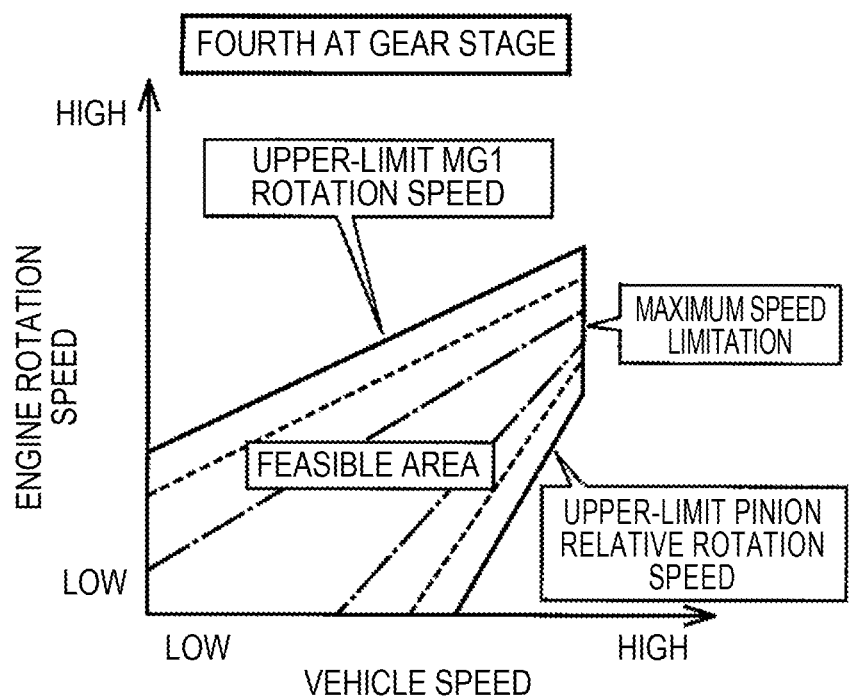
FIG. 15 is a diagram illustrating an example of a feasible area of the engine rotation speed in the vehicle illustrated in FIG. 10 at a fourth AT gear stage.

FIGS. 12, 13, 14, and 15 are diagrams illustrating an example of a feasible area of the engine rotation speed Ne on a two-dimensional coordinate system with the vehicle speed V and the engine rotation speed Ne as variables and illustrating an embodiment other than illustrated in FIG. 7 in the first embodiment. FIG. 12 illustrates a case in which the stepped gear shifting unit 218 is set to the first AT gear stage, FIG. 13 illustrates a case in which the stepped gear shifting unit 218 is set to the second AT gear stage, FIG. 14 illustrates a case in which the stepped gear shifting unit 218 is set to the third AT gear stage, and FIG. 15 illustrates a case in which the stepped gear shifting unit 218 is set to the fourth AT gear stage. In FIGS. 12, 13, 14, and 15, the basic idea for defining the feasible area of the engine rotation speed Ne is the same as described above with reference to FIG. 7. As the stepped gear shifting unit 218 is set to a higher AT gear stage at a certain vehicle speed V, the rotation speed of the ring gear R0 which is the output rotation speed of the stepless gear shifting unit 216 becomes lower. Accordingly, in a low area of the engine rotation speed Ne, the feasible area of the engine rotation speed Ne which is defined according to the upper limit of the relative rotation speed of the second pinion P2 is enlarged to a higher vehicle speed side at a higher AT gear stage. At the third AT gear stage or at the fourth AT gear stage, the rotation speed of the ring gear R0 decreases and thus the feasible area of the engine rotation speed Ne is not defined according to the upper-limit MG2 rotation speed Nmlim, but the feasible area of the engine rotation speed Ne is defined according to a maximum vehicle speed of the vehicle 200. When the AT gear stage of the stepped gear shifting unit 218 is on a high side and the rotation speed of the ring gear R0 decreases, the MG1 rotation speed Ng is likely to increase. Accordingly, in a low vehicle speed area, limitation on a high rotation side of the feasible area of the engine rotation speed Ne which is defined according to the upper-limit MG1 rotation speed Nglim increases as the AT gear stage becomes higher.

As described above, the same advantages as in the first embodiment are obtained in this embodiment.

Figure 16:
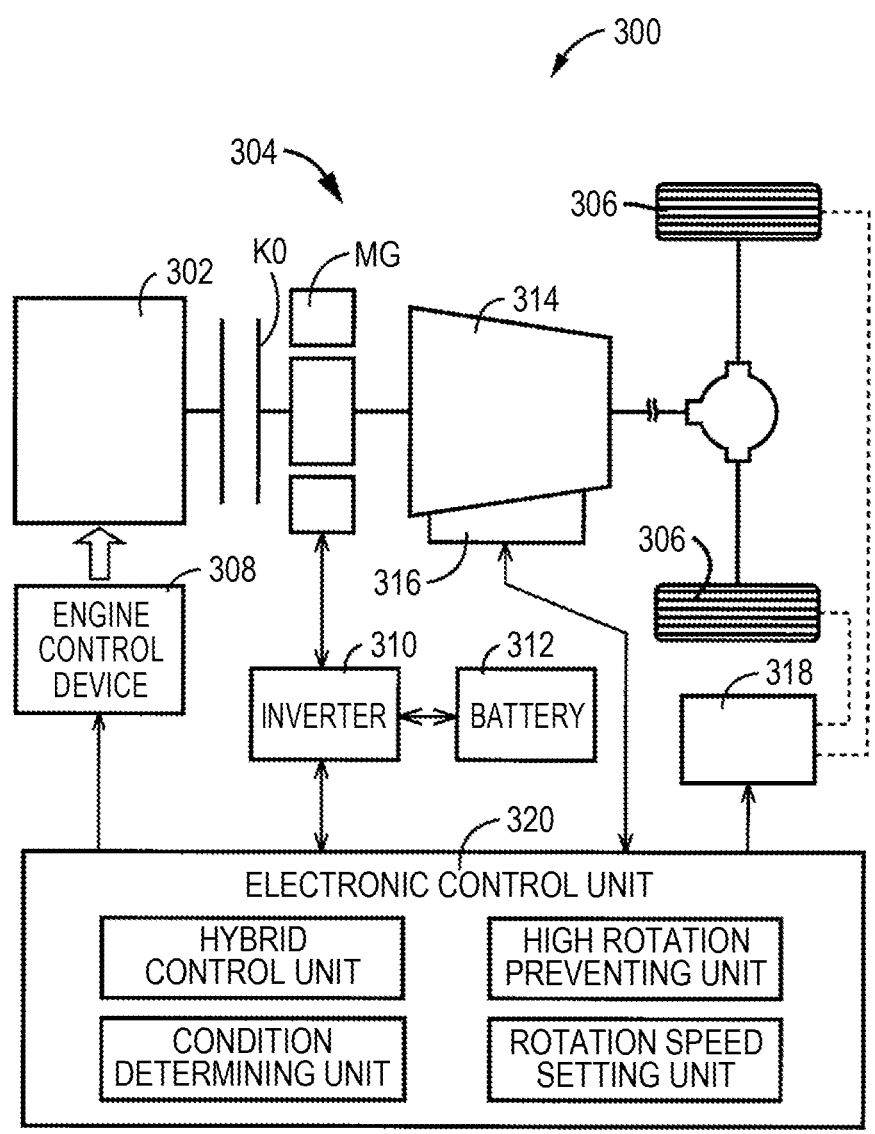
FIG. 16 is a diagram schematically illustrating a configuration of a vehicle to which the present disclosure is applied and which is different from the vehicles illustrated in FIGS. 1 and 10.

In this embodiment, a vehicle 300 which is different from the vehicle 10 described above in the first embodiment and which is illustrated in FIG. 16 is exemplified. FIG. 16 is a diagram schematically illustrating a configuration of a vehicle 300 to which the present disclosure is applied. In FIG. 16, the vehicle 300 is a hybrid vehicle including an engine 302, a rotary machine MG, a power transmission device 304, and driving wheels 306.

The engine 302 has the same configuration as the engine 12 described above in the first embodiment. An engine torque Te of the engine 302 is controlled by causing an electronic control unit 320 which will be described later to control an engine control device 308 such as an electronic throttle valve, a fuel injection device, an ignition device, and a waste gate valve which are provided in the vehicle 300.

The rotary machine MG is a rotary electric machine having a function of an electric motor and a function of a power generator and is called a motor generator. The rotary machine MG is a rotary machine that is connected to the driving wheels 306 via the power transmission device 304 in a power-transmittable manner. The rotary machine MG is connected to a battery 312 that is a power storage device provided in the vehicle 300 via an inverter 310 provided in the vehicle 300. An MG torque Tmg which is an output torque of the rotary machine MG is controlled by causing the electronic control unit 320 to control the inverter 310.

The power transmission device 304 includes a clutch K0 and an automatic transmission 314. An input rotary member of the automatic transmission 314 is connected to the engine 302 via the clutch K0 and is directly connected to the rotary machine MG. In the power transmission device 304, power of the engine 302 is transmitted to the driving wheels 306 sequentially via the clutch K0, the automatic transmission 314, and the like and power of the rotary machine MG is transmitted to the driving wheels 306 via the automatic transmission 314 and the like. The engine 302 and the rotary machine MG are power sources for travel of the vehicle 300 that are connected to the driving wheels 306 in a power-transmittable manner.

The clutch K0 is a hydraulic frictional engagement device that connects or disconnects a power transmission path between the engine 302 and the driving wheels 306. The automatic transmission 314 is, for example, a known planetary gear type automatic transmission including a plurality of planetary gear units or a plurality of engagement devices similarly to the stepped gear shifting unit 218 described above in the second embodiment. In the automatic transmission 314, one gear stage of a plurality of gear stages is formed by causing a hydraulic pressure control circuit 316 which is provided in the vehicle 300 and which is driven by the electronic control unit 320 which will be described later to control engagement oil pressures of the plurality of engagement devices.

The vehicle 300 can perform motor-driven travel in which electric power from the battery 312 is used and only the rotary machine MG is used as the power source for travel in a state in which the clutch K0 is disengaged and operation of the engine 302 is stopped. The vehicle 300 can perform hybrid travel in which the engine 302 operates in a state in which the clutch K0 is engaged and at least the engine 302 is used as the power source for travel.

The vehicle 300 includes a wheel brake device 318 that is a brake device that applies a wheel brake torque to the wheels (the driving wheels 306 and driven wheels which are not illustrated). The wheel brake device 318 has the same configuration as the wheel brake device 87 described above in the first embodiment.

The vehicle 300 further includes an electronic control unit 320 which is a controller including a control device for the vehicle 300 associated with control of the engine 302, the rotary machine MG, and the like. The electronic control unit 320 has the same configuration as the electronic control unit 100 described above in the first embodiment. The electronic control unit 320 is supplied with various signals which are the same as supplied to the electronic control unit 100. Various command signals which are the same as output from the electronic control unit 100 are output from the electronic control unit 320. The electronic control unit 320 has functions equivalent to the functions of the hybrid control unit 102, the condition determining unit 104, the high rotation preventing unit 106, and the rotation speed setting unit 108 which are included in the electronic control unit 100. The electronic control unit 320 can realize a control function capable of preventing a decrease in power performance due to a decrease in the engine torque Te and preventing a high-rotation state of the second rotary machine MG2 which is the same function as realized by the electronic control unit 100 described above in the first embodiment.

As described above, the same advantages as in the first embodiment are obtained in this embodiment.

While embodiments of the present disclosure have been described above in detail with reference to the accompanying drawings, the present disclosure can be applied to other aspects.

For example, in the first embodiment, when the vehicle condition is the normal vehicle condition, a constant maximum rotation speed Nmmax which is determined in advance is set regardless of the supercharging pressure Pchg, but an applicable embodiment of the present disclosure is not limited to this aspect. For example, when the vehicle condition is the normal vehicle condition as well as when the vehicle condition is the predetermined vehicle condition, the maximum rotation speed Nmmax based on the supercharging pressure Pchg may also be set. In this case, in S20 in the flowchart illustrated in FIG. 9, for example, a high rotation limit (=limited area enlargement) based on the supercharging pressure Pchg is calculated using a high-rotation limit map for the normal vehicle condition which is the same as the high-rotation limit map for the predetermined vehicle condition illustrated in FIG. 8, and the maximum rotation speed Nmmax which is a predetermined default value is corrected to a smaller value using the calculated limited area enlargement. For example, the high-rotation limit at the same supercharging pressure Pchg in the high-rotation limit map for the normal vehicle condition decreases in comparison with that in the high-rotation limit map for the predetermined vehicle condition. The maximum rotation speed Nmmax based on the supercharging pressure Pchg may be set to a constant value regardless of whether the vehicle condition is the predetermined vehicle condition. In this case, S10 in the flowchart illustrated in FIG. 9 is unnecessary, the high-rotation limit is calculated using a predetermined constant high-rotation limit map regardless of the vehicle condition, and the maximum rotation speed Nmmax is set in S20 to S40. In the high-rotation limit map illustrated in FIG. 8, the high-rotation limit based on the likelihood that the MG2 rotation speed Nm which is a vehicle condition will reach the upper-limit MG2 rotation speed Nmlim is set, but, for example, in the high-rotation limit map, a constant high-rotation limit based on the supercharging pressure Pchg may be set regardless of the likelihood that the MG2 rotation speed Nm which is a vehicle condition will reach the upper-limit MG2 rotation speed Nmlim. In the high-rotation limit map illustrated in FIG. 8, as the likelihood that the driving wheels 16 will idle decreases or as a degree of decrease in control responsiveness decreases, the slope of the high-rotation limit which increases with an increase in the supercharging pressure Pchg may be set to decrease.

In the first embodiment, the vehicle 10 may be a vehicle which does not include the gear shifting unit 58 and in which the engine 12 is connected to the differential unit 60 like the vehicle 200. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear mechanism in which the first rotary machine MG1 and the drive gear 74 are connected to the pinion which is rotationally driven by the engine 12 and a pair of bevel gears engaging with the pinion, respectively. The second planetary gear mechanism 82 may be a mechanism with a configuration in which some rotary elements of two or more planetary gear units are connected to each other and the engine, the rotary machine, and the driving wheels are connected to the rotary elements of such planetary gear units in a power-transmittable manner.

In the second embodiment, the one-way clutch F0 is exemplified as a lock mechanism that can fix the carrier CA0 in a non-rotatable manner, but an applicable embodiment of the present disclosure is not limited to the aspect. This lock mechanism may be an engagement device such as an engaging clutch, a hydraulic frictional engagement device such as a clutch or a brake, a dry engagement device, an electromagnetic frictional engagement device, or a magnetic powder type clutch, which selectively connects the connection shaft 226 to the case 214. Alternatively, the vehicle 200 does not have to include the one-way clutch F0.

In the second embodiment, the stepped gear shifting unit 218 is exemplified above as the automatic transmission constituting a part of the power transmission path between the differential mechanism 230 and the driving wheels 206, but an applicable embodiment of the present disclosure is not limited to the aspect. The automatic transmission may be an automatic transmission such as a synchromesh parallel biaxial automatic transmission, a known dual clutch transmission (DCT) with two input shafts as the synchromesh parallel biaxial automatic transmission, or a known belt type stepless transmission. The same is true of the automatic transmission 314 of the vehicle 300 in the third embodiment.

In the above-mentioned embodiments, a mechanical pump type supercharger that is rotationally driven by the engine or the electric motor may be provided in addition to or instead of the exhaust turbine type supercharger 18. Alternatively, the supercharger 18 may include an actuator, for example, an electric motor, that can control a rotation speed of the compressor 18c.

The above-mentioned embodiments are merely exemplary and the present disclosure can be embodied in various aspects which have been subjected to various modifications and improvements based on knowledge of those skilled in the art.

What is claimed is:

1. A control device for a hybrid vehicle including an engine with a supercharger which serves as a travel power source and a rotary machine which is connected to driving wheels in a power-transmittable manner, the rotary machine having a function of a motor and a function of a power generator, the hybrid vehicle is capable of hybrid driving powered by the engine and driven by the rotary machine, the control device comprising:

an electronic control unit including a CPU, a RAM, a ROM, and an input and output interface, and the CPU configured to perform various types of control of the vehicle by performing signal processing in accordance with a program which is stored in the ROM in advance while using a temporary storage function of the RAM, the electronic control unit further comprising a high rotation preventing unit and a rotation speed setting unit;

the high rotation preventing unit configured to:
  compare a maximum rotation speed with a rotation speed of the rotary machine when the rotary machine is serving as a motor, and
  decrease an output torque of the engine such that the rotation speed of the rotary machine does not reach a predetermined upper-limit rotation speed when the rotation speed of the rotary machine is higher than the maximum rotation speed and within a margin of the predetermined upper-limit rotation speed of the rotary machine; and the rotation speed setting unit is configured to set the maximum rotation speed to a lower value when a supercharging pressure from the supercharger is above a predetermined threshold than when the supercharging pressure is below the predetermined threshold.

2. The control device for a hybrid vehicle according to claim 1, wherein the rotation speed setting unit is configured to set the maximum rotation speed to a lower value as the supercharging pressure increases.

3. The control device for a hybrid vehicle according to claim 1, the electronic control unit further comprising a condition determining unit configured to determine whether a vehicle condition is a predetermined vehicle condition in which the rotation speed of the rotary machine will reach the predetermined upper-limit rotation speed, wherein the rotation speed setting unit is configured to set the maximum rotation speed to a lower value when it is determined that the vehicle condition is the predetermined vehicle condition than when it is determined that the vehicle condition is not the predetermined vehicle condition.

4. The control device for a hybrid vehicle according to claim 3, wherein the rotation speed setting unit is configured to perform setting of the maximum rotation speed based on the supercharging pressure only when it is determined that the vehicle condition is the predetermined vehicle condition.

5. The control device for a hybrid vehicle according to claim 3, wherein the condition determining unit is configured to determine whether the vehicle condition is the predetermined vehicle condition based on whether a travel road of the hybrid vehicle is in a surface condition in which the driving wheels will idle.

6. The control device for a hybrid vehicle according to claim 3, wherein the condition determining unit is configured to determine whether the vehicle condition is the predetermined vehicle condition based on whether a braking operation of a brake device that applies a brake torque to the driving wheels is limited.

7. The control device for a hybrid vehicle according to claim 3, wherein the rotation speed setting unit is configured to set the maximum rotation speed to a lower value as the vehicle condition is a vehicle condition in which the rotation speed of the rotary machine will reach the predetermined upper-limit rotation speed.

* * * * *